United States Patent [19]
Miyazawa et al.

[11] Patent Number: 5,467,426
[45] Date of Patent: * Nov. 14, 1995

[54] DIGITAL FUZZY INFERENCE APPARATUS HAVING TIME-DIVISIONAL CONTROL FUNCTION

[75] Inventors: Azuma Miyazawa, Mitaka; Koji Mizobuchi; Takashi Suzuki, both of Hachioji, all of Japan

[73] Assignee: Olympus Optical Co., Ltd., Tokyo, Japan

[*] Notice: The portion of the term of this patent subsequent to Feb. 9, 2010, has been disclaimed.

[21] Appl. No.: 2,661

[22] Filed: Jan. 11, 1993

Related U.S. Application Data

[63] Continuation of Ser. No. 750,707, Aug. 20, 1991, Pat. No. 5,185,849, which is a continuation-in-part of Ser. No. 536,444, Jun. 12, 1990, abandoned.

[30] Foreign Application Priority Data

Jun. 27, 1989 [JP] Japan ................................. 1-164513
Mar. 19, 1990 [JP] Japan ................................. 2-68639

[51] Int. Cl.$^6$ ........................................ G06F 9/44
[52] U.S. Cl. ............................................. 395/3; 395/900
[58] Field of Search ................................. 395/3, 61, 900

[56] References Cited

U.S. PATENT DOCUMENTS 4,716,540 12/1987 Yamakawa .............................. 364/807
4,837,725 6/1989 Yamakawa .............................. 364/807
4,852,007 7/1989 Yasaunobu et al. ................. 364/426.01
4,860,243 8/1989 Ueno et al. ............................. 364/807
4,875,184 10/1989 Yamakawa .............................. 364/807

OTHER PUBLICATIONS

Watanabe et al. "A VLSI Fuzzy Logic Controller with Reconfigurable, Cascadable Architecture", IEEE Journal of Solid–State Circuits, vol. 25(2), Apr. 1990, pp. 376–382.
Lim et al, "Implementing Fuzzy Rule–Based Systems on Silicon Chips", IEEE Expert, Feb. 90, pp. 31–45.

*Primary Examiner*—Robert W. Downs
*Attorney, Agent, or Firm*—Frishauf, Holtz, Goodman, Langer & Chick

[57] ABSTRACT

A digital fuzzy inference apparatus performs fuzzy inference by time-divisional control. A latch circuit latches an input signal. A parameter storage circuit stores a plurality of sets of parameters for defining membership functions constituting a plurality of fuzzy rules. A parameter switching circuit sequentially and selectively outputs one of the plurality of sets of parameters from the parameter storage circuit in accordance with a clock pulse. Every time one set of parameters are output from the parameter switching circuit, a single operation circuit performs a fuzzy rule operation with respect to the input signal stored in the latch circuit by using a membership function defined by the parameters, and outputs a degree to which the input signal meets the rule. An operation result storage circuit stores the output from the operation circuit at a storage position designated by the output parameters. A center-of-gravity calculator obtains the center of gravity of values stored in the operation result storage circuit when all the fuzzy operations based on the plurality of sets of parameters are completed.

7 Claims, 38 Drawing Sheets

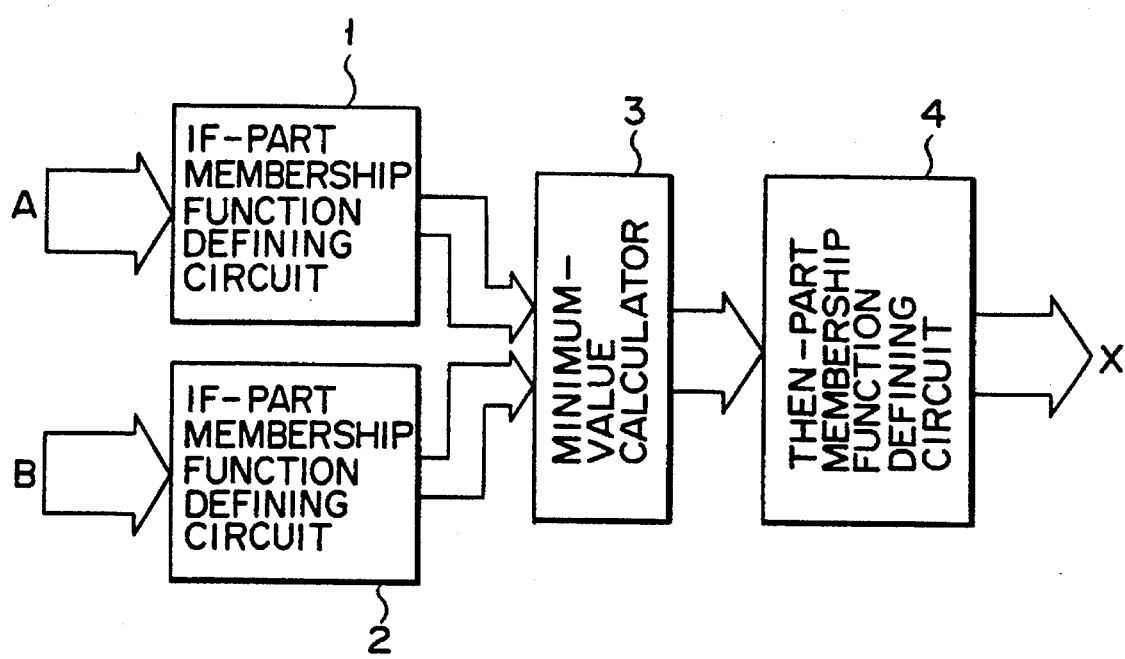
F I G. 1

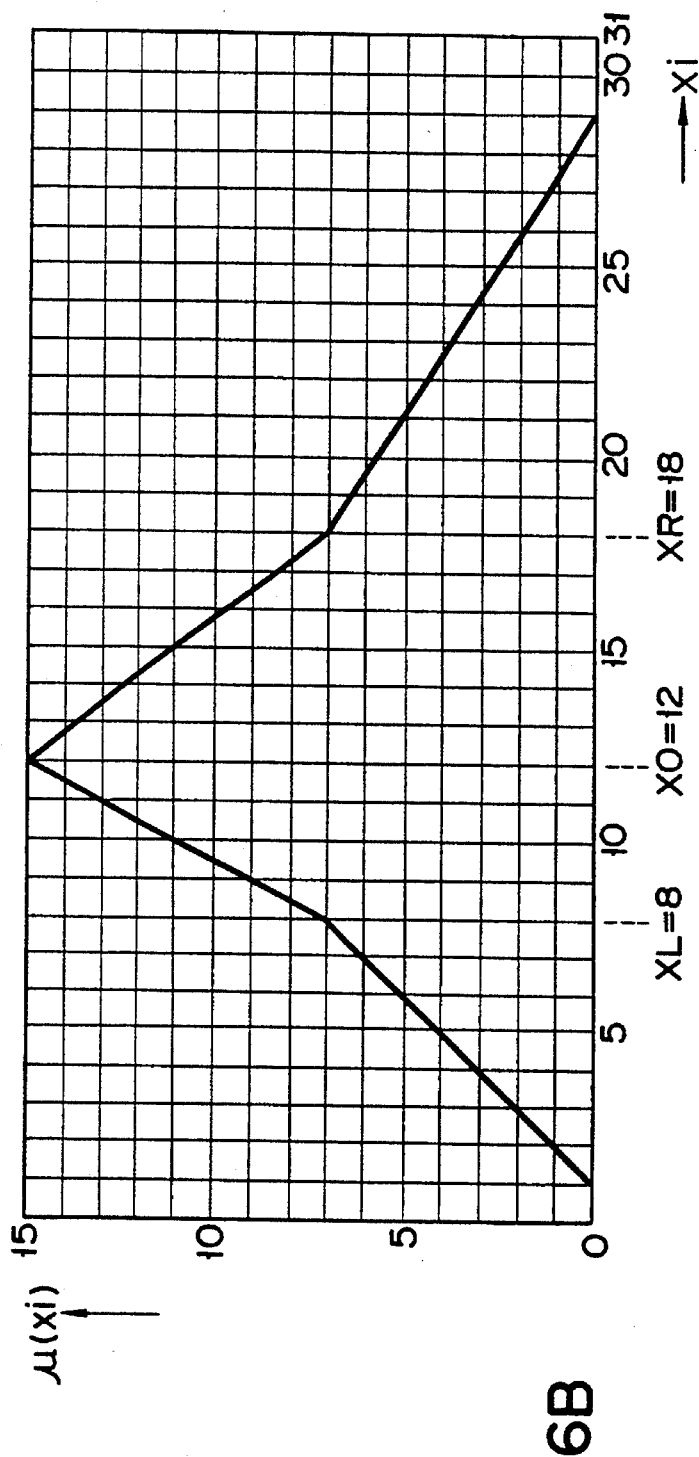
F I G. 6B
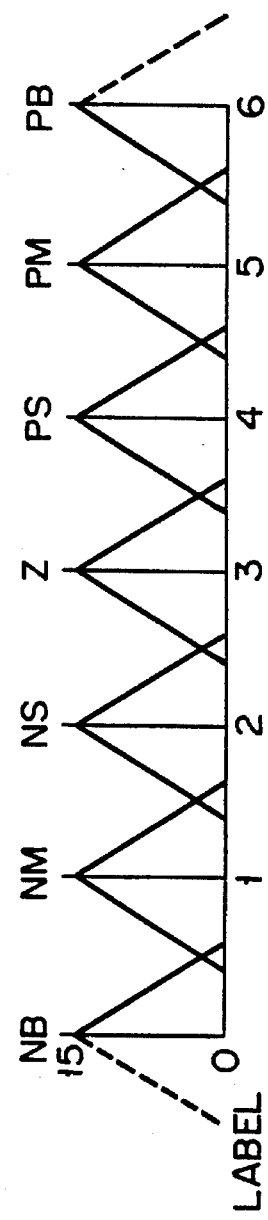
F I G. 6C

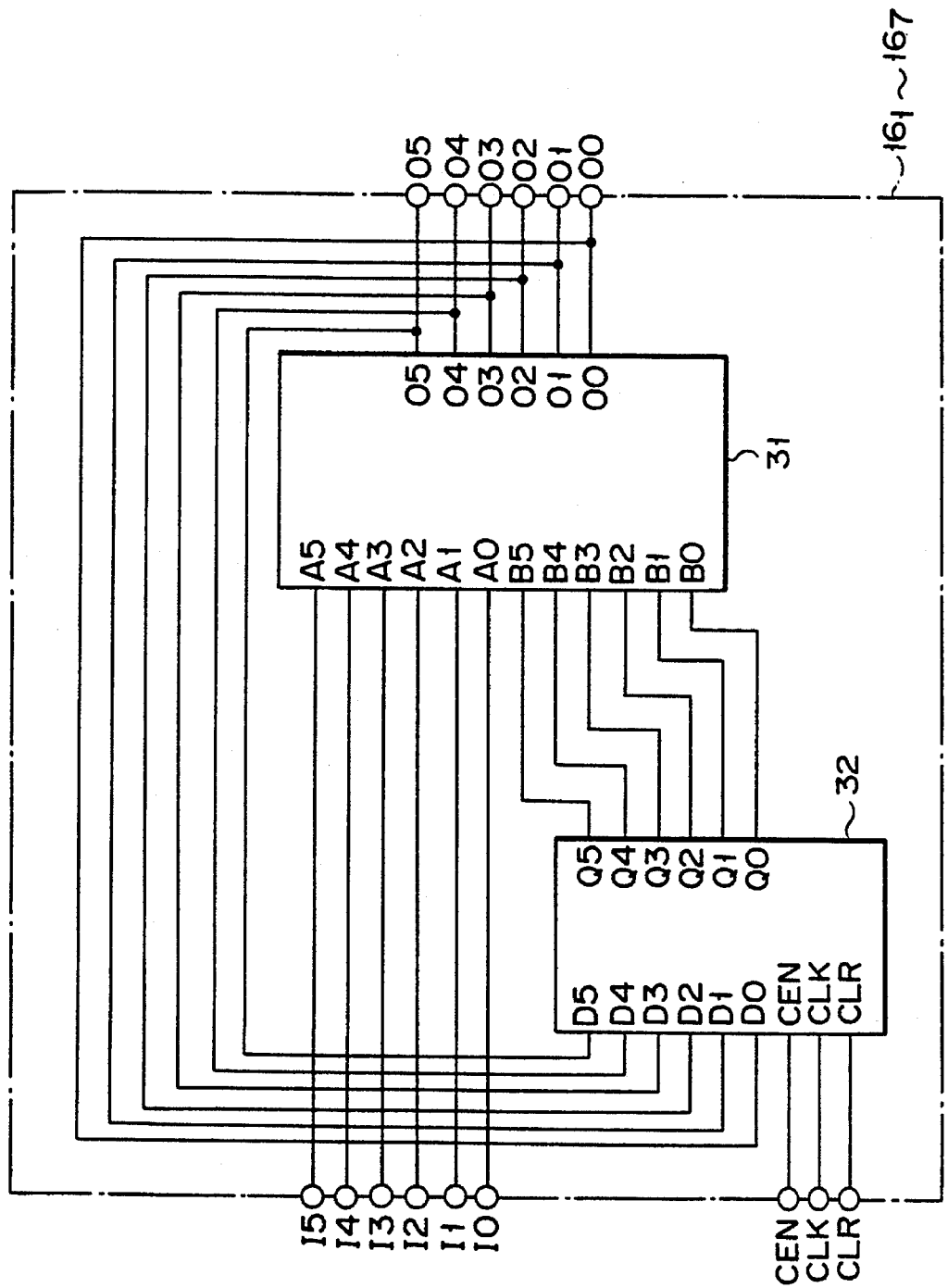
F I G. 7

| EXTERNAL INPUT | | | | D-FF | | | OUT-PUT | STATE |
|---|---|---|---|---|---|---|---|---|
| in | CEN | CLK | CLR | Dn | Qn | $\overline{Qn}$ | On | — |
| L | X | X | L | L | L | H | L | RESET |
| H | X | X | L | H | L | H | H | RESET |
| L | L | L | H | L | L | H | L | in = Qn |
| H | L | L | H | H | L | H | H | in > Qn |
| L | L | ↗ | H | L | L | H | L | in = Qn |
| H | L | ↗ | H | H | L | H | H | in > Qn |
| L | H | ↗ | H | H | H | L | H | in < Qn |
| H | H | ↗ | H | H | H | L | H | in = Qn | x ---- DON'T CARE

F I G. 8

| RSCT1 | RSCT0 | FUNCTION |
|---|---|---|
| 0 | 0 | DMA |
| 0 | 1 | M REGISTER DESIGNATION |
| 1 | 0 | C REGISTER DESIGNATION |
| 1 | 1 | TIME-DIVISIONAL FUZZY INFERENCE CONTROL |

F I G. 11

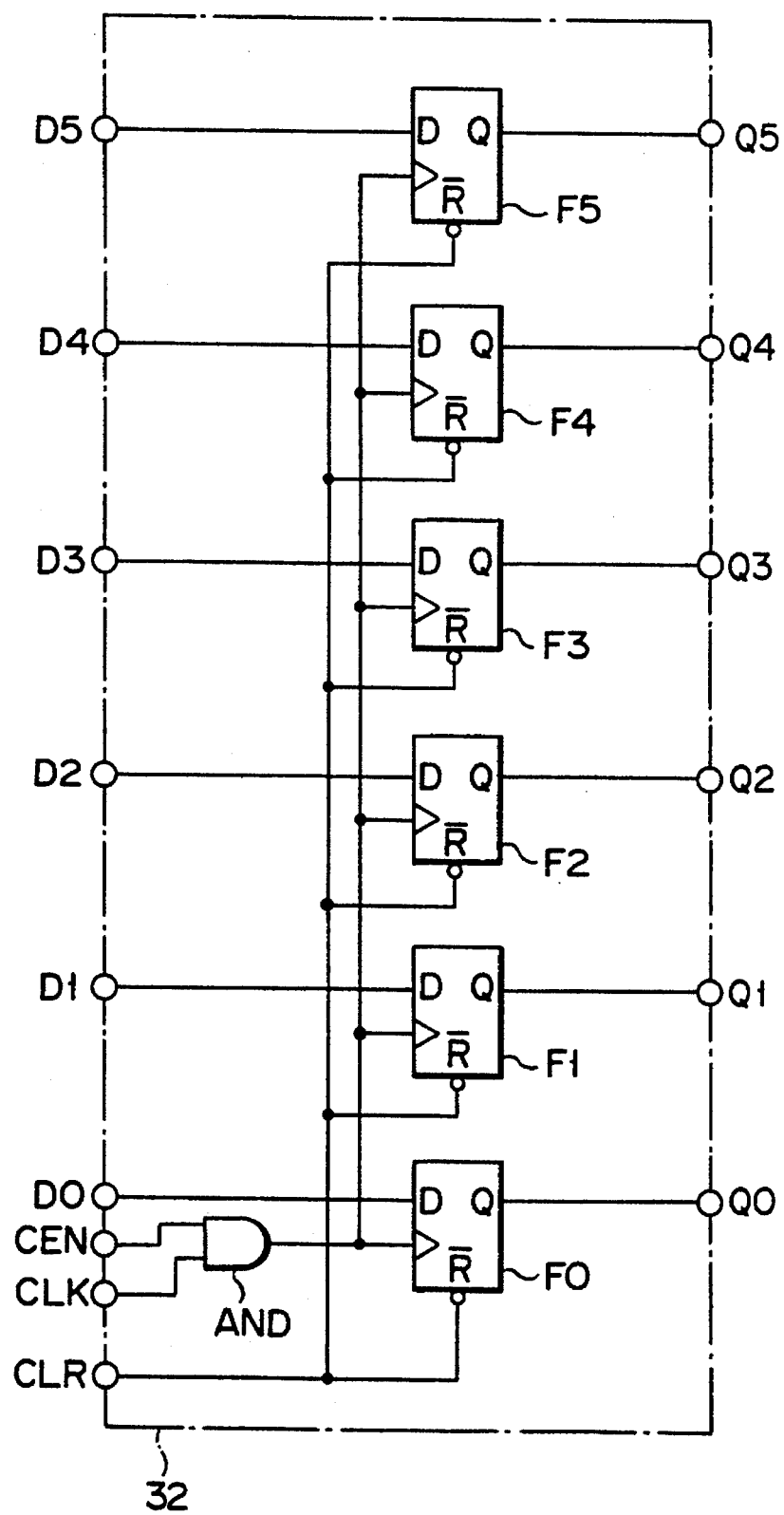
F I G. 10

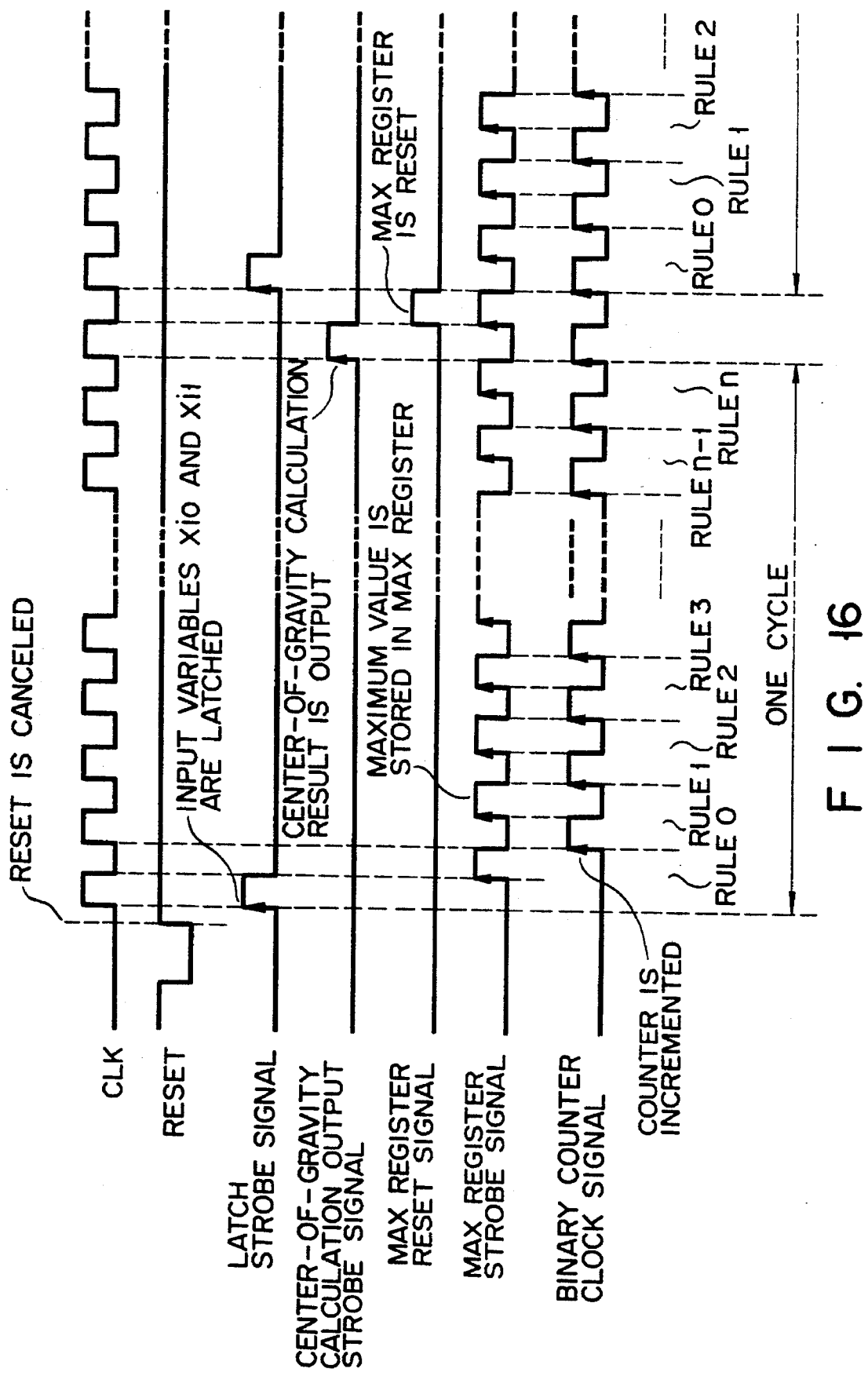
F I G. 16

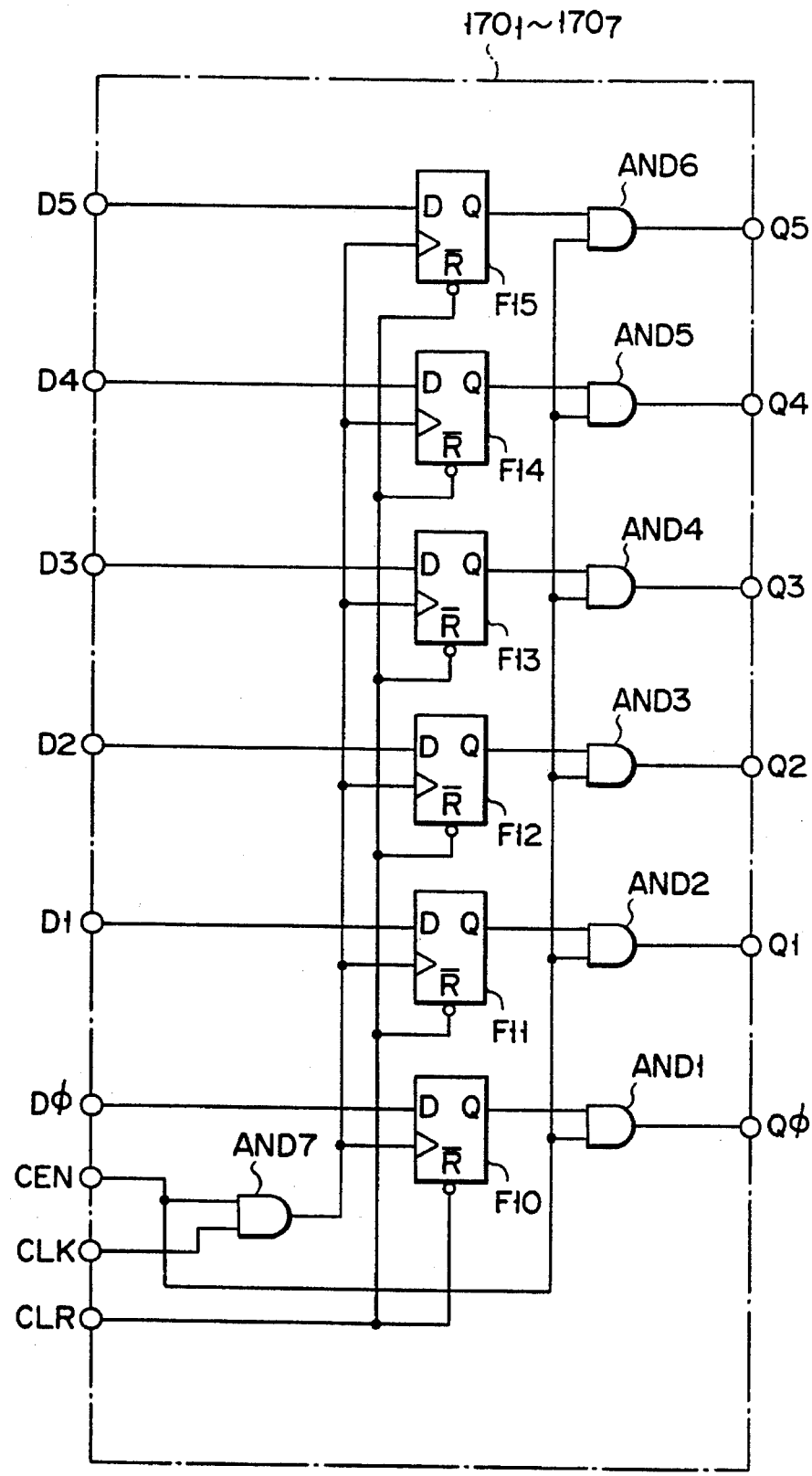
F I G. 19

| INPUT | | OUTPUT | | | |
|---|---|---|---|---|---|
| i1 | i0 | o3 | o2 | o1 | o0 |
| L | L | H | H | H | L |
| L | H | H | H | L | H |
| H | L | H | L | H | H |
| H | H | L | H | H | H |

FIG. 22B

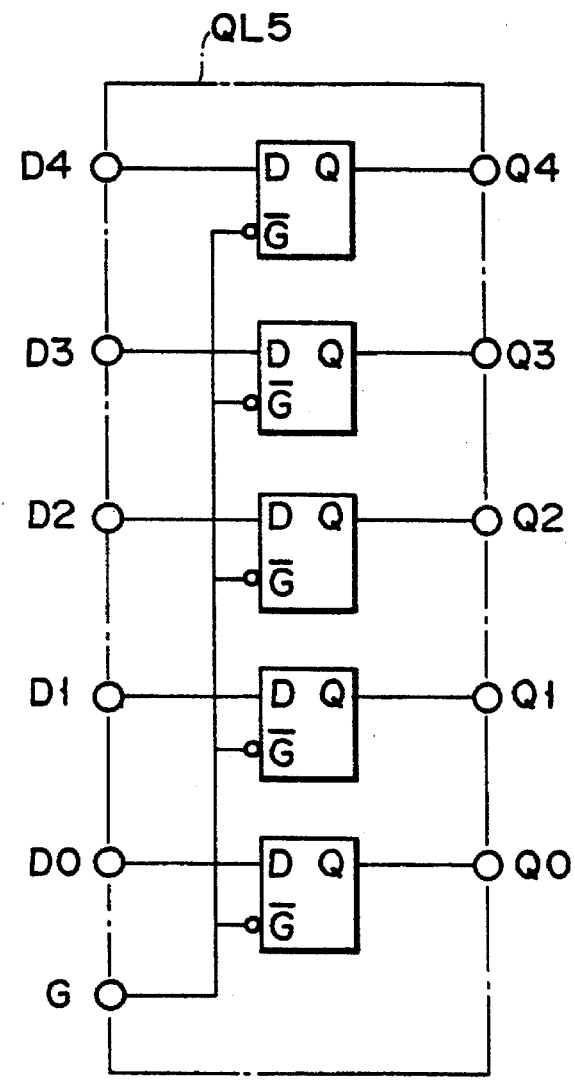
F I G. 23A    F I G. 23B

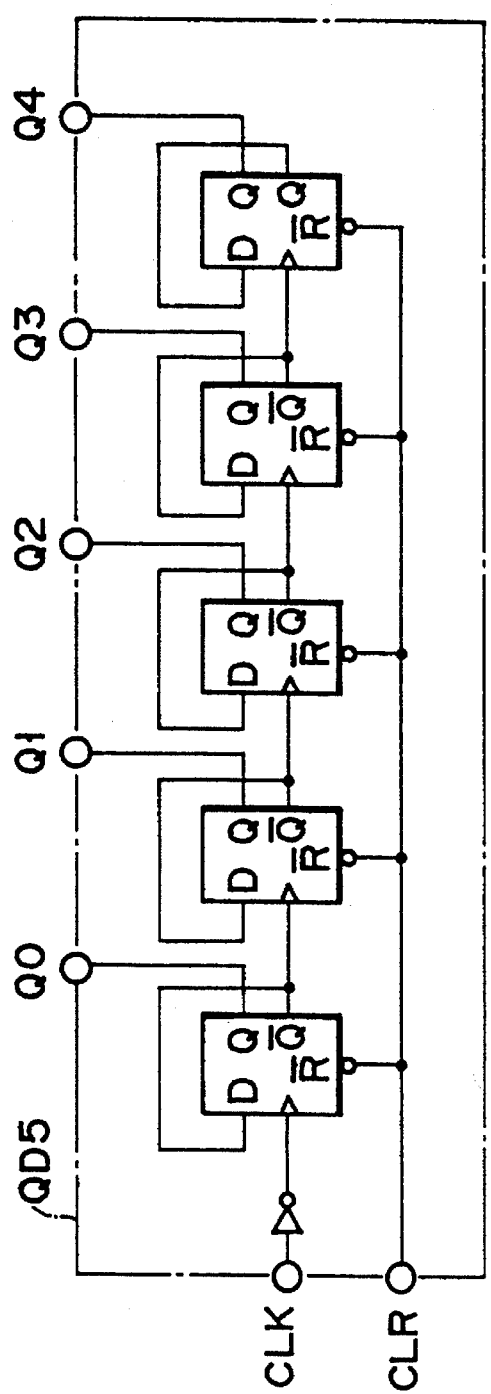
F I G. 24A
F I G. 24B

| INPUT | | OUTPUT |
|---|---|---|
| CLK | CLR | Qn |
| * | L | L |
| ⤒ | H | COUNT |
| ⤓ | H | NO CHANGE |

*--- DON'T CARE

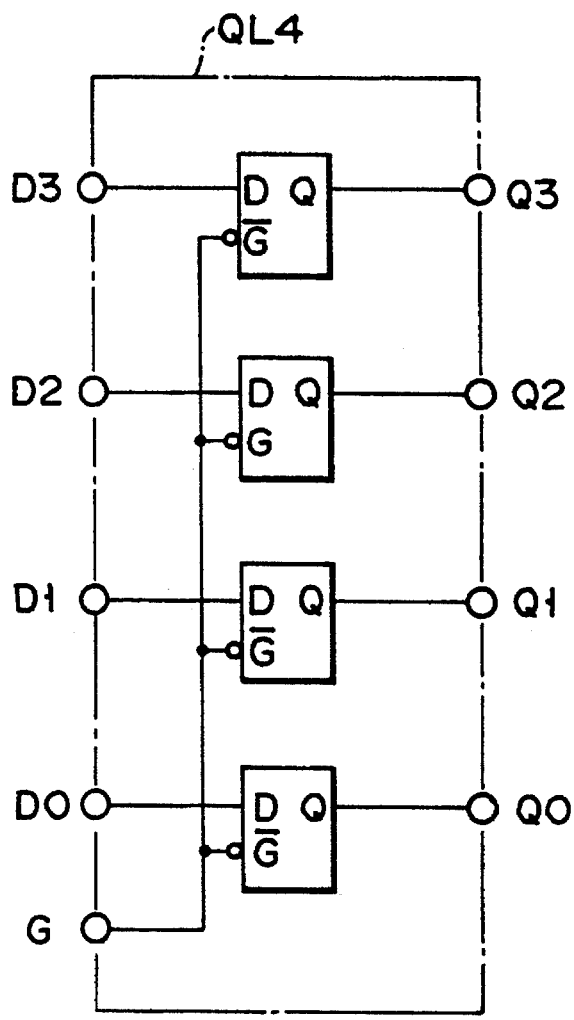
F I G. 26A    F I G. 26B
*--- DON'T CARE

| INPUT | | | OUTPUT | |
|---|---|---|---|---|
| $\overline{S0}$ | $\overline{R0}$ | $\overline{R1}$ | Q | $\overline{Q}$ |
| L | L | L | L | H |
| L | H | H | H | L |
| H | L | H | L | H |
| H | H | L | L | H |
| H | H | H | * | * |

*---DON'T CARE

| INPUT | | OUTPUT | |
|---|---|---|---|
| $\overline{SO}$ | $\overline{RO}$ | Q | $\overline{Q}$ |
| L | L | L | H |
| L | H | H | L |
| H | L | L | H |
| H | H | * | * |

*---DON'T CARE

*--- DON'T CARE

| INPUT | | | | | OUTPUT | | | | |
|---|---|---|---|---|---|---|---|---|---|
| A4,B4 | A3,B3 | A2,B2 | A1,B1 | A0,B0 | O0 | O1 | O2 | O3 | O4 |
| A4>B4 | * | * | * | * | A0 | A1 | A2 | A3 | A4 |
| A4<B4 | * | * | * | * | B0 | B1 | B2 | B3 | B4 |
| A4=B4 | A3>B3 | * | * | * | A0 | A1 | A2 | A3 | A4 |
| A4=B4 | A3<B3 | * | * | * | B0 | B1 | B2 | B3 | B4 |
| A4=B4 | A3=B3 | A2>B2 | * | * | A0 | A1 | A2 | A3 | A4 |
| A4=B4 | A3=B3 | A2<B2 | * | * | B0 | B1 | B2 | B3 | B4 |
| A4=B4 | A3=B3 | A2=B2 | A1>B1 | * | A0 | A1 | A2 | A3 | A4 |
| A4=B4 | A3=B3 | A2=B2 | A1<B1 | * | B0 | B1 | B2 | B3 | B4 |
| A4=B4 | A3=B3 | A2=B2 | A1=B1 | A0>B0 | A0 | A1 | A2 | A3 | A4 |
| A4=B4 | A3=B3 | A2=B2 | A1=B1 | A0<B0 | B0 | B1 | B2 | B3 | B4 |
| A4=B4 | A3=B3 | A2=B2 | A1=B1 | A0=B0 | A0/B0 | A1/B1 | A2/B2 | A3/B3 | A4/B4 |

*--- DON'T CARE

F I G. 31B

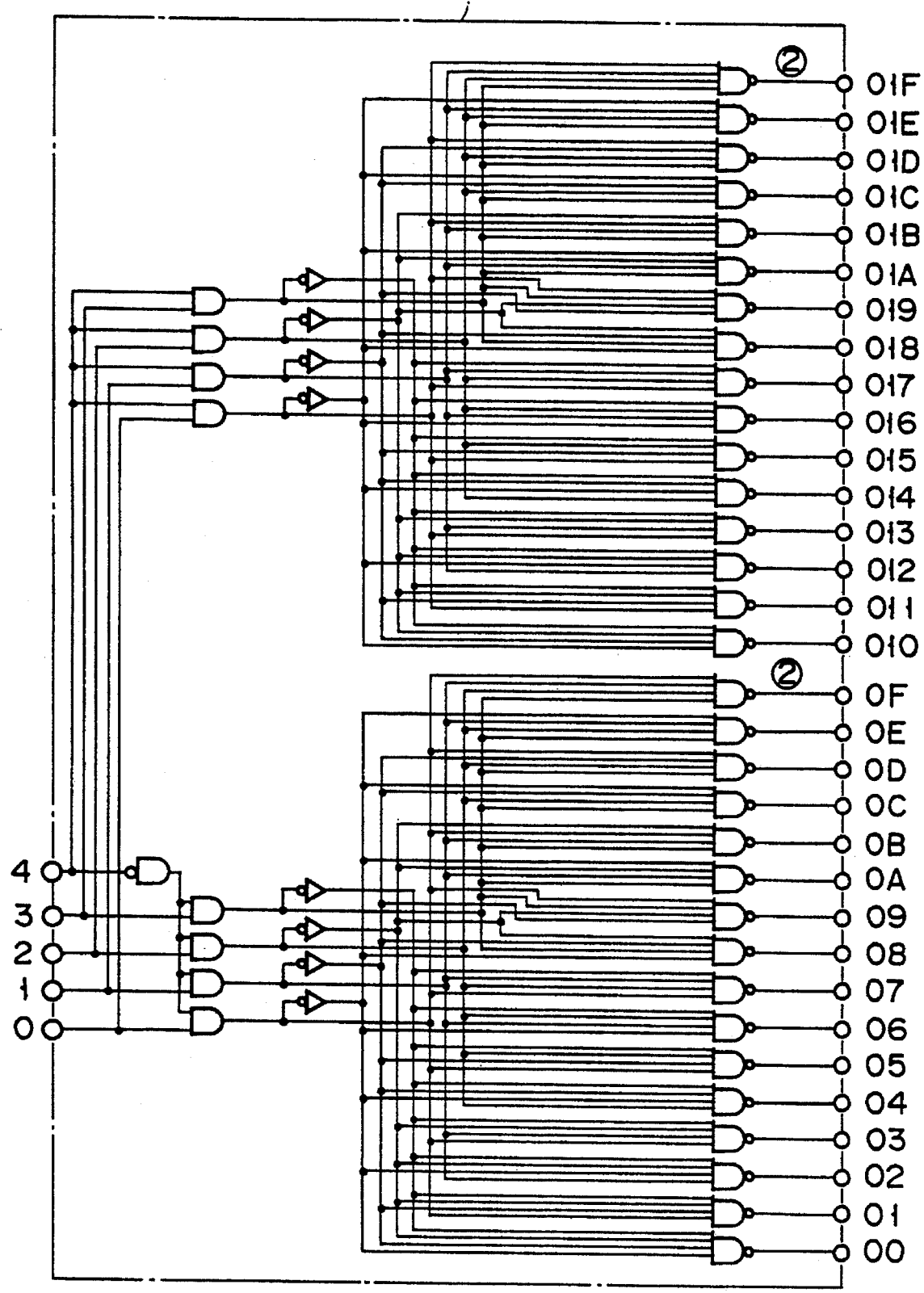
F I G. 32A

FIG. 32B 5,467,426

DIGITAL FUZZY INFERENCE APPARATUS HAVING TIME-DIVISIONAL CONTROL FUNCTION

This is a continuation of application Ser. No. 07/750,707 filed Aug. 20, 1991, now U.S. Pat. No. 5,185,849, which is a Continuation-in-Part application of Ser. No. 07/536,444 filed Jun. 12, 1990, now abandoned.

BACKGROUND OF THE INVENTION

1. Field of the Invention

The present invention relates to a digital fuzzy inference apparatus for performing fuzzy inference and, more particularly, to a digital fuzzy inference apparatus for performing fuzzy inference by time-divisional control.

2. Description of the Related Art

The fuzzy theory was suggested by L. A. Zadeh, Professor at California State University, in 1965, and the possibility of practical use of the theory was proven by E. H. Mamdani, Professor at the University of London, in 1974. Various means of implementing the theory have been proposed afterward. There are the following typical examples of such means.

For example, Published Unexamined Japanese Patent Application No. 58-192407 discloses an operation control system for vehicles which lessens the frequency of notch-changes by inference using software. Published Unexamined Japanese Patent Application No. 61-20428 discloses analog fuzzy logic circuits implemented by current circuits.

Furthermore, in Nikkei Electronics, No. 457, Oct. 3, 1988, there are described processors using memories developed at Hosei University, North Carolina State University and so on, and processors dedicated to fuzzy controllers for writing data for inference into instruction memories, which are developed at Togai Infralogic Company.

The conventional fuzzy inference systems have the following drawbacks. The system based on software can be implemented for the time being by means of a personal computer, microcomputer or the like, but it is very slow in inference speed. The analog system using current circuits requires an interface for use in cooperation with a digital computer. The system using memories and the dedicated processor system require large-scale development tools.

Prior to a description of the drawbacks of a fuzzy inference circuit which is designed to be formed into an IC (integrated circuit), an outline of the fuzzy inference will be described first. The fuzzy inference is a type of inference which uses fuzzy rules (fuzzy inference rules) expressed by ambiguous (fuzzy) words that human beings employ in their every day life. The fuzzy rules can be described such that "if A=BIG and B=NORMAL then X=SMALL".

FIG. 1 is a block diagram showing a fuzzy inference circuit in which an if-part "if A=BIG and B=NORMAL" and a then-part "X=SMALL" are expressed by a fuzzy rule as the minimum unit. Referring to FIG. 1, reference numerals 1 and 2 respectively denote if-part membership function defining circuits; 3, a minimum-value calculator; and 4, a then-part membership function defining circuit. Reference symbols A and B denote input variables; and X, an output variable.

FIG. 1 shows the fuzzy inference circuit corresponding to one rule. However, a plurality of rules are normally required. In addition, the fuzzy inference circuit includes the two if-part membership function defining circuits. However, the number of if-part membership function defining circuits is changed in accordance with the number of input variables. For example, FIG. 2 shows an arrangement for N rules (input variables: A, B), which includes a maximum-value calculator 6 and a center-of-gravity calculator 7. Referring to FIG. 2, reference numerals $5_1$ to $5_n$ denote fuzzy inference circuits identical to the circuit shown in FIG. 1. These circuits are arranged in units of rules.

The maximum-value calculator 6 synthesizes output variables X for the respective rules and obtains the maximum values thereof. The center-of-gravity calculator 7 calculates the center of gravity from the respective maximum values.

When the circuit size of hardware required for one fuzzy inference is considered, a basic arrangement includes N rules, N maximum-value calculators, and one center-of-gravity calculator. That is, an increase/decrease in number of rules directly influences the size of a fuzzy inference circuit. Therefore, the following drawbacks are posed in a fuzzy inference circuit which is designed to be formed into an IC. Since fuzzy inference generally requires a plurality of rules, the circuit size is greatly increased. In addition, if the number of rules is increased due to the modification of a system, addition of circuits cannot be easily performed.

SUMMARY OF THE INVENTION

It is, therefore, an object of the present invention to provide a digital fuzzy inference apparatus which realizes a simplified circuit arrangement by performing fuzzy inference for each rule by time-divisional control.

It is another object of the present invention to provide a digital fuzzy inference apparatus which allows a reduction in circuit size so as to facilitate formation into an IC.

It is still another object of the present invention to provide a versatile digital fuzzy inference apparatus in which the number of rules and the conditions of rules can be easily changed.

In order to achieve the above objects, according to the present invention, there is provided a digital fuzzy inference apparatus comprising:

latch means for latching an input signal;

parameter storage means for storing a plurality of sets of parameters for defining membership functions constituting a plurality of fuzzy rules;

parameter switching means for causing the parameter storage means to sequentially and selectively output one of the plurality of sets of parameters in accordance with a clock pulse;

single operation means for, every time one set of parameters are output from the parameter switching means, performing a fuzzy rule operation with respect to the input signal stored in the latch means by using a membership function defined by the parameters, and outputting a degree to which the input signal meets the rule;

operation result storage means for storing the output from the operation means, as the operation result, at a storage position designated by the parameters; and center-of-gravity calculating means for obtaining a center-of-gravity of value stored in the operation result storage means when all the fuzzy rule operations based on the plurality of sets of parameters are completed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

The above and other features of the present invention will be described in detail below with reference to the accompanying drawings.

FIG. 1 is a block diagram showing a basic arrangement of a fuzzy inference circuit;

FIG. 6B is a view of another example of a membership function;

FIG. 6C is a view showing labels and their positions, which are used in this embodiment;

FIG. 7 is a block diagram showing an arrangement of a sequential comparison type maximum-value calculator unit;

FIG. 8 is a truth table of the sequential comparison type maximum-value calculator unit;

FIG. 10 is a block diagram showing an arrangement of an FF circuit group;

FIG. 11 is a table showing a relationship between external control signals and the functions of a sequence controller;

FIG. 16 is a timing chart for explaining the actual operation of fuzzy inference based on time-divisional control; and FIGS. 17 to 19 are block diagrams for explaining other embodiments of the present invention.

FIG. 22A shows a 4–15 line decoder and FIG. 22B is a table illustrating the function thereof;

FIG. 23A shows a 5-bit D-latch, and FIG. 23B is a table illustrating the function thereof;

FIG. 24A shows a 5-bit binary counter, and FIG. 24B is a table illustrating the function thereof;

FIG. 26A shows a 4-bit D-latch, and FIG. 26B is a table illustrating the function thereof;

FIG. 31B is a table illustrating the function thereof;

FIG. 32A shows the internal circuit of the address decoder 22, and FIG. 32B is a table illustrating the function thereof;

DETAILED DESCRIPTION OF THE PREFERRED EMBODIMENTS

An embodiment of the present invention will be described below with reference to the accompanying drawings.

Figure 2:
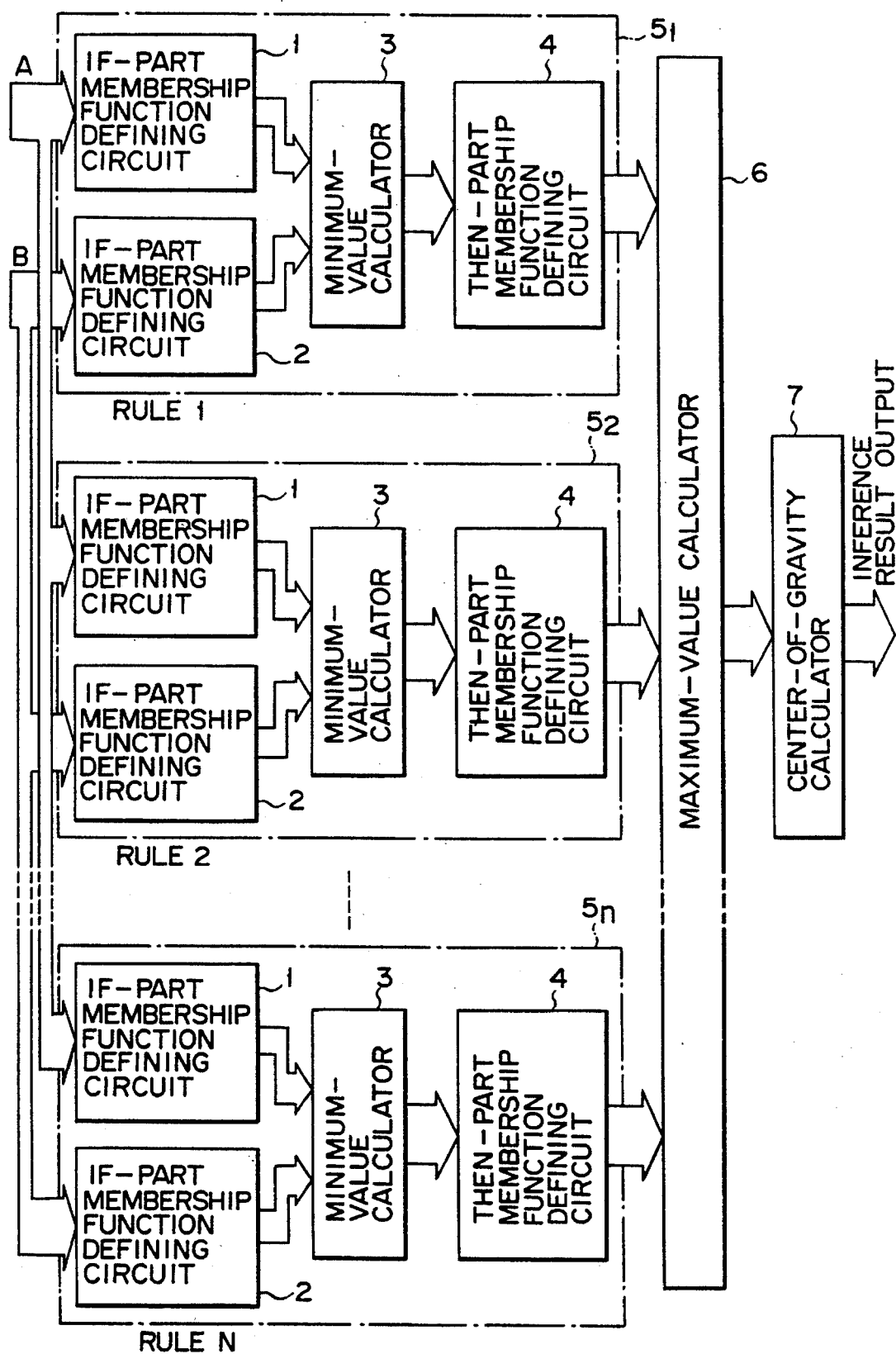
FIG. 2 is a block diagram showing a conventional digital fuzzy inference apparatus.
Figure 3:
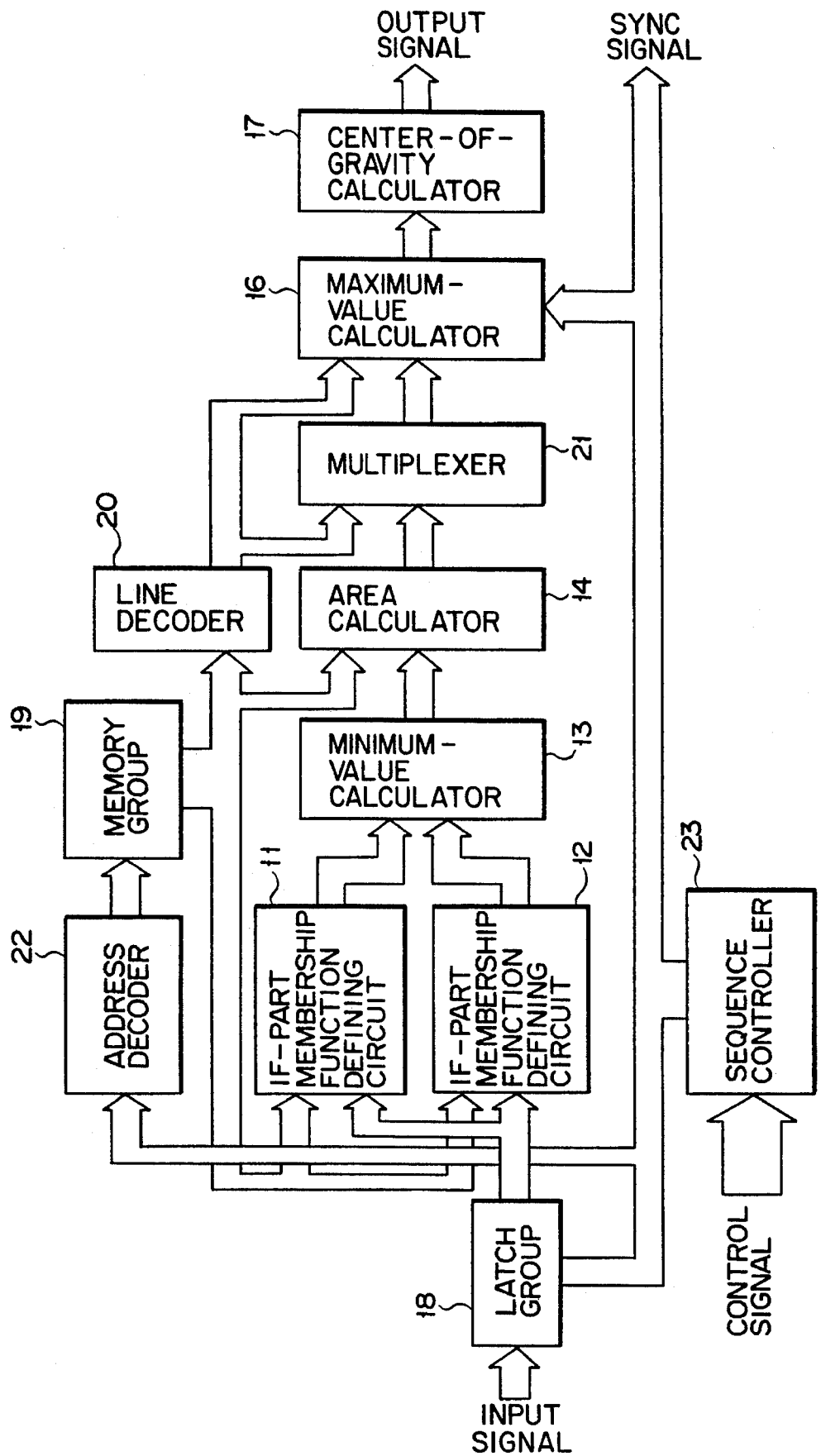
FIG. 3 is a block diagram showing a basic arrangement of a digital fuzzy inference apparatus according to the present invention.

FIG. 3 is a block diagram showing a fundamental arrangement of a digital fuzzy inference apparatus based on time-divisional control according to the present invention, specifically, a one-rule one center-of-gravity circuit.

Referring to FIG. 3, a latch group 18 receives input variables of two series and distributes them to two if-part membership function defining circuits 11 and 12. The if-part membership function defining circuits 11 and 12 respectively output membership values corresponding to the input variables. The minimum value of the membership outputs is selected by a minimum-value calculator 13. An output from the minimum-value calculator 13 is input to an area calculator 14. The area calculator 14 then outputs an area output representing a degree to which the input variable meets a corresponding rule. Therefore, the area output is changed in accordance with the degree to which an input variable meets a corresponding rule. This area output is supplied to a multiplexer 21. The multiplexer 21 selects an operation unit corresponding to a predetermined label of a maximum-value calculator or switching means 16 for each rule in response to an address signal from a line decoder 20. The maximum-value calculator 16 synthesizes membership values for the respective rules. That is, the maximum-value calculator 16 compares the then-parts of the respective rules to obtain the maximum value thereof, and generates a new membership function. A center-of-gravity calculator or output fixing means 17 calculates a value of center of gravity from the synthesized membership function as the maximum value. This value of center of gravity is used as an inferential result. In addition, as shown in FIG. 3, a sequence controller 23 outputs a sync signal representing an inference end to an external unit in synchronism with the end of a fuzzy rule operation.

A memory group 19 serves as a parameter storage means and stores definition parameters of if-part and then-part functions for each rule. An address decoder 22 serves to designate an address of the memory group 19. The line decoder 20 serves to designate an address of a then-part membership function. The data of the designated address is selected by the multiplexer 21. The sequence controller 23 as a timing generating means supplies timing signals (sync signals) for time-divisional control, which constitutes a characteristic feature of the present invention, to the latch group 18, the address decoder 22, and the maximum-value calculator 16 in response to an external control signal. Although the above-described embodiment uses input variables of two series which are received by the latch group 18, the use of input variables of more than three series is possible, in which case if-part membership function defining circuits are added in accordance with the number of input variables.

The circuitry for if-part membership function defining circuits 11 and 12, the circuitry for minimum-value calculator 13, the circuitry for area calculator 14, and the circuitry for center of gravity calculator 17 are described in commonly assigned U.S. Ser. No. 07/426,576 filed Oct. 24, 1989 which is hereby incorporated by reference.

Figure 4A:
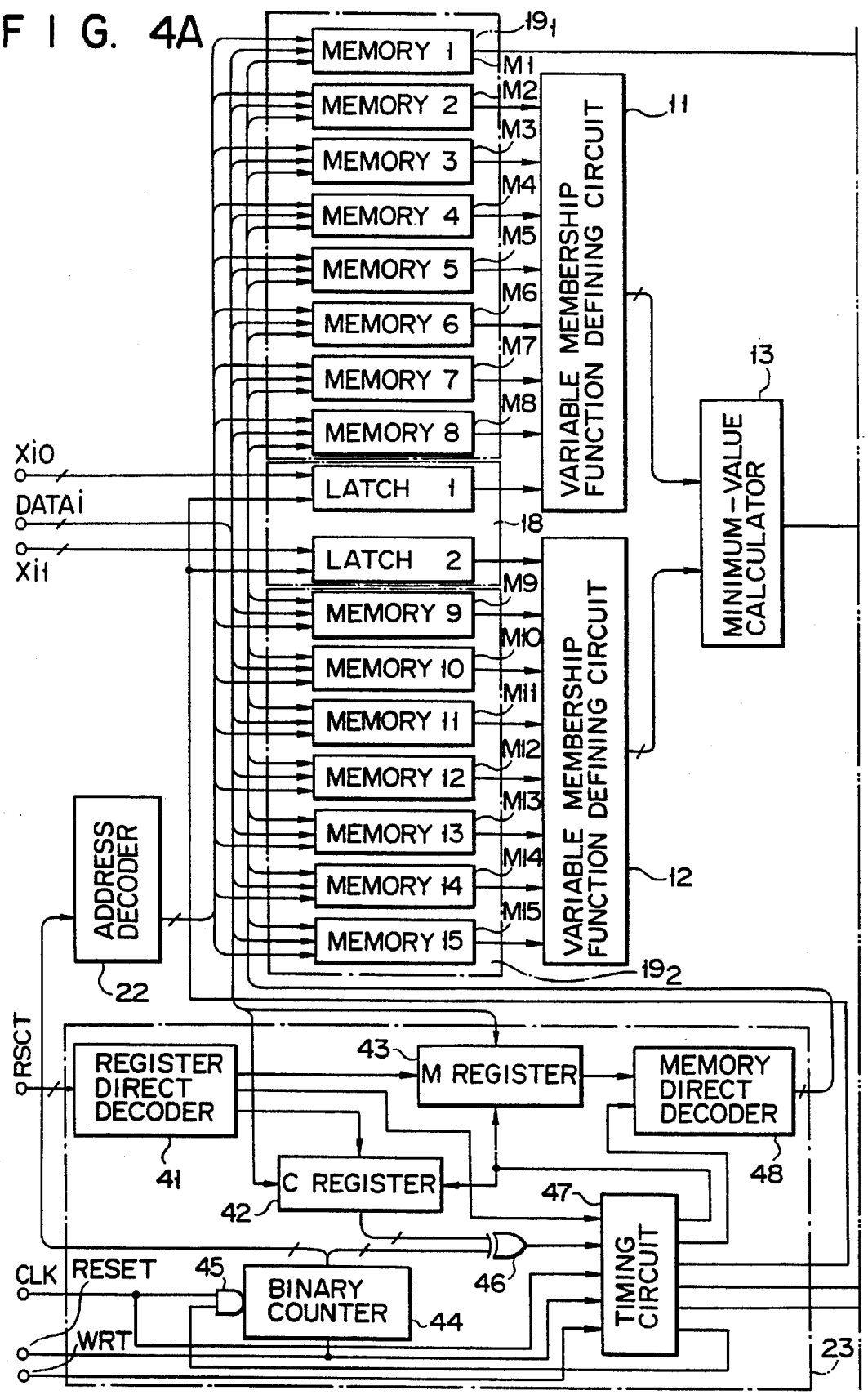
FIGS. 4A and 4B are a block diagram showing the digital fuzzy inference apparatus in more detail.
Figure 4B:
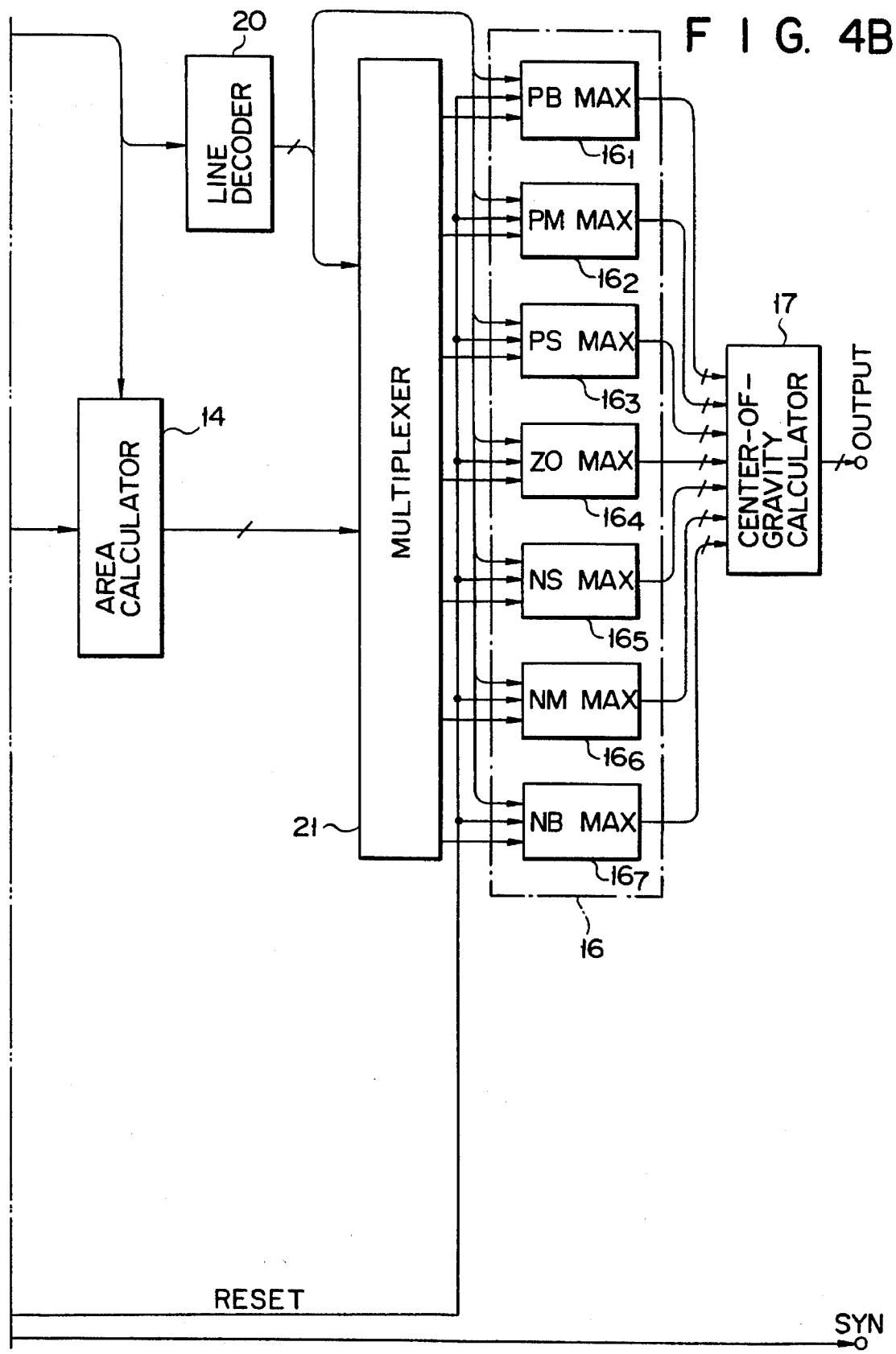

FIGS. 4A and 4B are a block diagram showing the digital fuzzy inference apparatus shown in FIG. 3 in more detail. Referring to FIG. 4A, reference numerals $19_1$ and $19_2$ denote memory groups for storing definition parameters of membership functions. Memory units $M_1$ to $M_{15}$ of the respective memory groups respectively correspond to the determined values of a variable membership function, i.e., inflection points $(X_O, X_L, X_R)$ and slopes $(k_1, k_2, k_3, k_4)$, and the address designation code of a then-part membership function. The data of an address designated by the address decoder 22 corresponds to one rule of time-divisional control. In response to an address signal from the line decoder 20, a signal is output from one of the output terminals of the multiplexer 21. More specifically, of seven sequential comparison type maximum-value calculator units which are arranged in accordance with the respective labels of the maximum-value calculator 16, one unit which is designated by $M_1$ is selected. In this case, the respective labels are: NB (Negative Big: considerably small); NM (Negative Medium: small); NS (Negative Small: slightly small); ZO (Zero: zero label); PS (Positive Small: slightly large); PM (Positive Medium: large); and PB (Positive Big: considerably large). These labels are shown in FIG. 6C.

Figure 5:
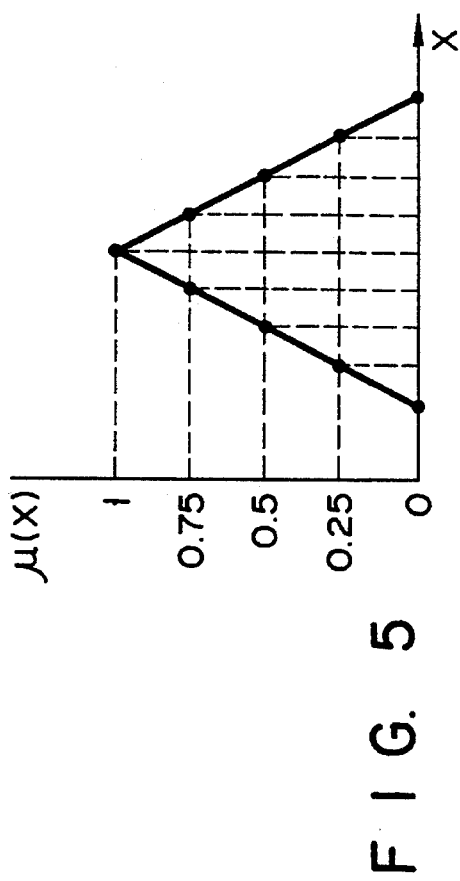
FIG. 5 is a graph showing a membership function approximated by straight lines.
Figure 6A:
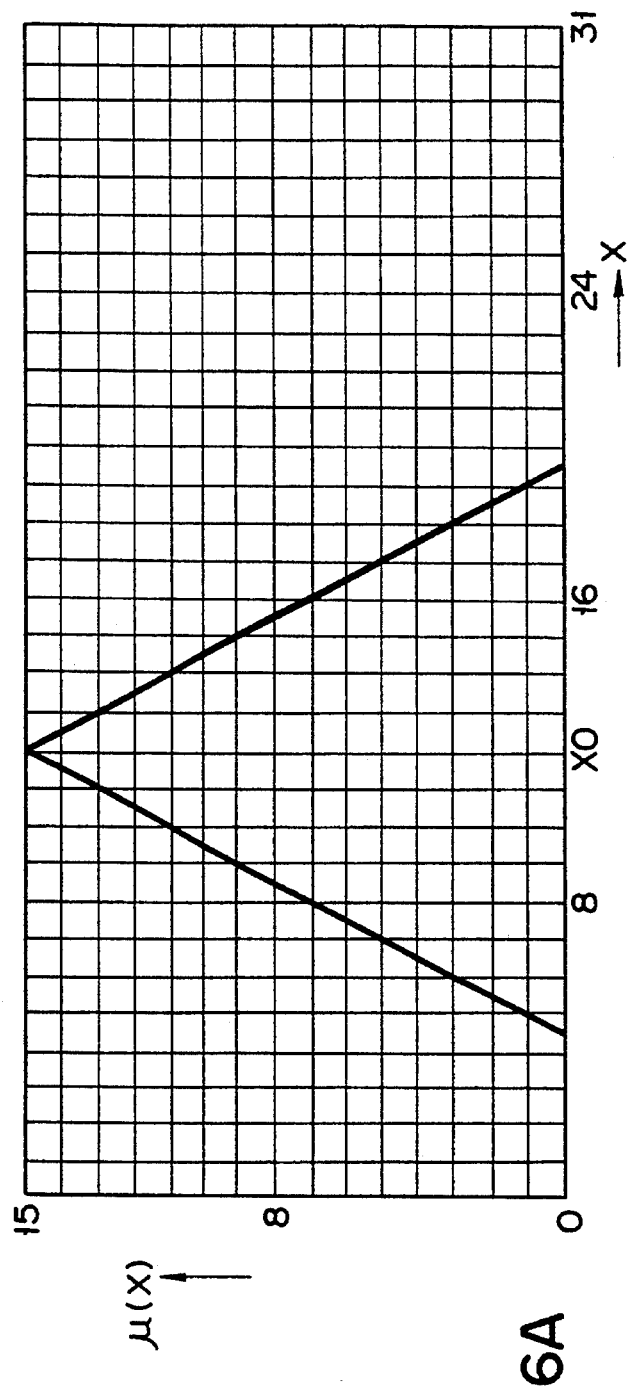
FIG. 6A is a graph for explaining the definition of the membership function.

A membership function and its slope will be briefly described below. In general, even if a membership function is represented by an isosceles triangle constituted by straight lines as shown in FIG. 5, no problem is posed in practical use. In this case, the use of the above described inflection points and slopes can be omitted. Furthermore, usually, a membership value continuously takes a value of, e.g., [0, 1]. However, a membership value may be represented by a discrete value as shown in FIG. 5, and this method of representation provides advantages in design of digital circuits. In order to define a membership function in this embodiment, such a matrix of 16 rows×32 columns as shown in FIG. 6A will be considered. A membership value is represented by a 4-bit binary code obtained by dividing [0, 1] into 16. In this way, the membership value can take a discrete value ranging from 0 to 15 and be expressed on the 16×32 matrix.

Similarly, an input variable is also represented by a 5-bit binary code ranging from 0 to 31. Assuming that a membership function is represented by a triangle as shown in FIG. 5, a membership function $\mu(x)$ can be defined by an input value $x_0$ at which the membership value takes the maximum value of 15 and a slope k with respect to an input value x. In this embodiment, the input value x is represented by five bits and the membership function $\mu(x)$ is represented by four bits. However, the number of bits may be freely set according to specific applications.

Not all the values of a membership function are required for subsequent calculation. Membership values $\mu(xi)$ corresponding to if-part inputs xi need only be obtained. If a membership function is defined on the 16×32 matrix shown in FIG. 6A, then the membership function $\mu(xi)$ can be represented by $$\mu(xi)=15-k\,x|x_O-xi|$$

where $x_O$ is the value of x at which the membership function $\mu(x)$ takes the maximum value of 15, xi is the if-part input, and k is the slope of the membership function. In the example of FIG. 6A, $x_O=15$ and k=2. To simplify the explanation, one inflection point $X_O$ and one slope K are used. However, when a membership function is shaped as shown in FIG. 6B, inflection points $(X_O, X_L, X_R)$ and slopes $(k_1, k_2, k_3, k_4)$ are used.

As shown in FIG. 4C, the above-mentioned maximum-value calculator 16 comprises seven sequential comparison type maximum-value calculator units $16_1$ to $16_7$ corresponding to the respective labels, i.e., NB (Negative Big: considerably small); NM (Negative Medium: small); NS (Negative Small: slightly small); ZO (Zero: zero label); PS (Positive Small: slightly large); PM (Positive Medium: large); and PB (Positive Big: considerably large). Each unit is connected to the line decoder 20, the multiplexer 21, and the sequence controller 23. Note that each label represents the address (position) of a then-part membership function.

FIG. 7 shows an arrangement of each of the sequential comparison type maximum-value calculator units $16_1$ to $16_7$. Each unit comprises a digital comparator 31 and an FF circuit group 32. This circuit is operated as follows. A reset signal (active "L") is input to an input terminal CLR, and the circuit is stabilized in an initial state. If input terminals I5 to I0 are at "L" level at this time, output terminals O5 to O0 are set at "L" level. When an input terminal In is changed from "L" level to "H" level while the input terminal CLR is at "H" level, an output terminal On is changed from "L" level to "H" level. When an input terminal CEN is set at "H" level while the input and output terminals In and On are respectively at "L" level and "H" level, the output terminal On is changed from "L" level to "H" level in synchronism with the leading edge of a clock to an input terminal CLK. That is, signals fed back from the output terminals O5 to O0 are input to input terminals D5 to D0 of the FF circuit group 32 again, and are temporarily held in accordance with a CLK signal synchronized with a system clock. With this operation, the maximum values of the signals from the output terminals O5 to O0 and from the input terminals I5 to I0 can be continuously compared with each other. Note that FIG. 8 shows the truth table of each sequential comparison type maximum-value calculator unit.

Figure 9:
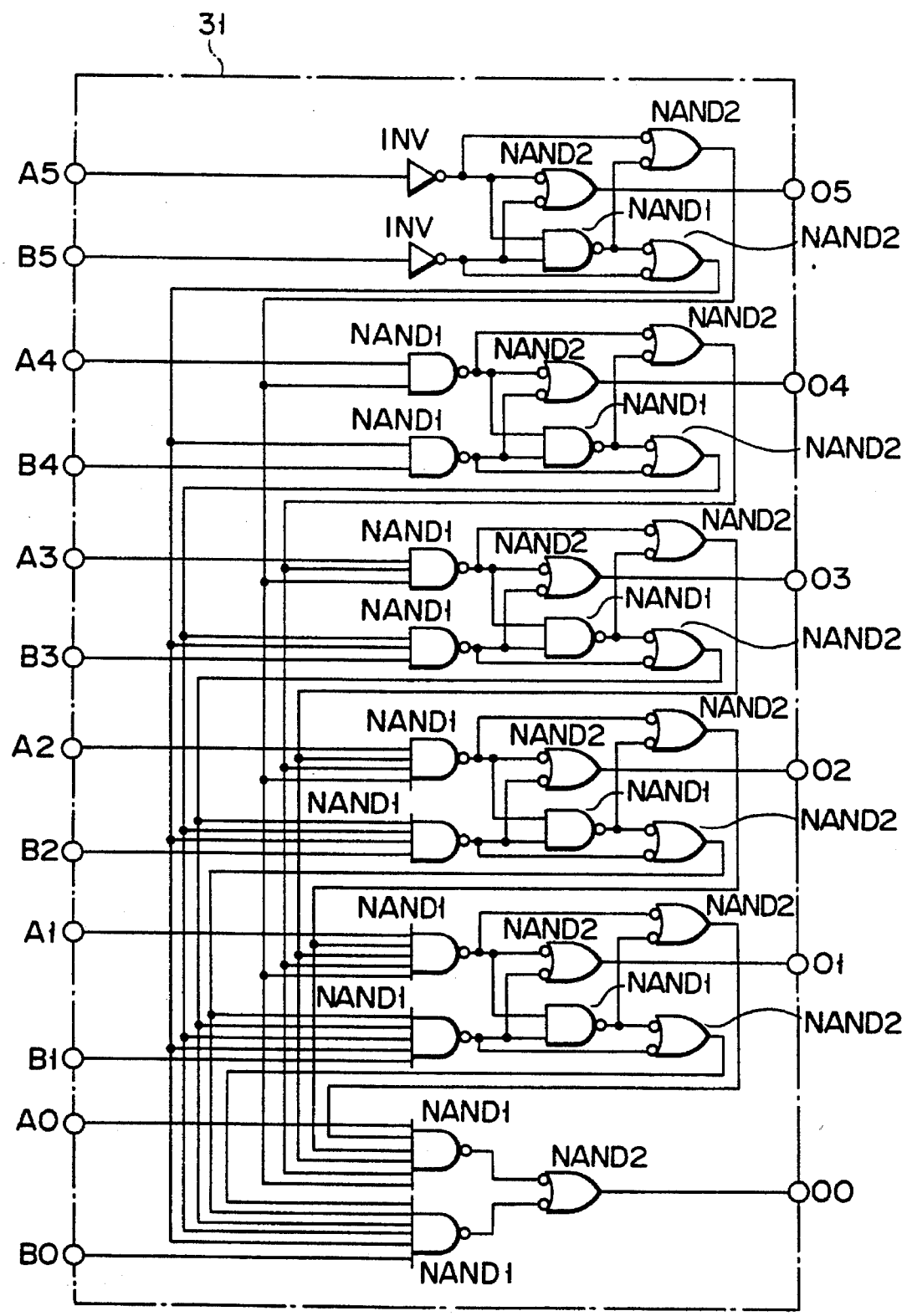
FIG. 9 is a block diagram showing an arrangement of a digital comparator.

FIG. 9 shows a detailed arrangement of the digital comparator 31. The digital comparator 31 comprises inverter circuits INVs, positive logic NANDs 1, and negative logic NANDs 2 which are connected to each other as in FIG. 9. FIG. 10 shows a detailed arrangement of the FF circuit group 32. The FF circuit group 32 comprises D-type flip-flop circuits $F_0$ to $F_5$ and an AND gate AND which are connected to each other as in FIG. 10.

The above-mentioned sequence controller 23 generates various timing signals in response to an external control signal RSCT, more specifically, signals RSCT0 and RSCT1, as shown in FIG. 4A. In addition, the controller 23 serves as a parameter switching means for causing the memory group 19 to sequentially and selectively output one of a plurality of sets of parameters. As shown in FIG. 4A, the sequence controller 23 includes a register direct decoder 41, a C register 42, an M register 43, a binary counter 44, an AND gate 45, an EXOR gate 46, a timing circuit 47, and a memory direct decoder 48. Note that FIG. 11 shows a relationship between the external control signals RSCT0 and RSCT1 and each function for sequence control.

The M register 43 and the C register 42 are used to designate memory units and to set the number of rules when membership function definition parameters are to be written in the memory units $M_1$ to $M_{15}$.

A sequence for storing a memory unit designation data code in the M register 43 through an external input terminal DATAi will be described below with reference to a flow chart in FIG. 12. As is apparent from FIG. 11, the M register 43 can be designated with step 200 by setting the external control signals RSCT0 and RSCT1 as RSCT0=1 and RSCT1=0, respectively.

If step 202 determines that the M register has been designated, a predetermined memory unit designation data code is input to the input terminal DATAi, per step 204, and is stored in the M register 43, per step 206, upon reception of an external signal WRT. If an output from the M register 43 is determined by step 208 to be acceptable, it causes the memory direct decoder 48 to select one of the memory units $M_1$ to $M_{15}$.

A sequence for storing a rule count setting data code in the C register 42 through the external input terminal DATAi will be described below with reference to a flow chart in FIG. 13. As is apparent from FIG. 11, the C register 42 can be designated, per step 210, by setting the external control signals RSCT0 and RSCT1 as RSCT0=0 and RSCT1=1, respectively. If step 212 determines that the C register has been designated, a predetermined rule count setting data code is input to the input terminal DATAi, per step 214, and is stored in the C register 42, per step 216, upon reception of the signal WRT. If an output from the C register 42 is determined by step 218 to be acceptable, it represents the address of one of the memory units $M_1$ to $M_{15}$, and is exclusive ORed with a carry value of the binary counter 44 to obtain binary data for detecting one cycle of fuzzy inference. The carry value of the binary counter 44 is input to the address decoder 22 for sequentially selecting the memory units $M_1$ to $M_{15}$.

Figure 14:
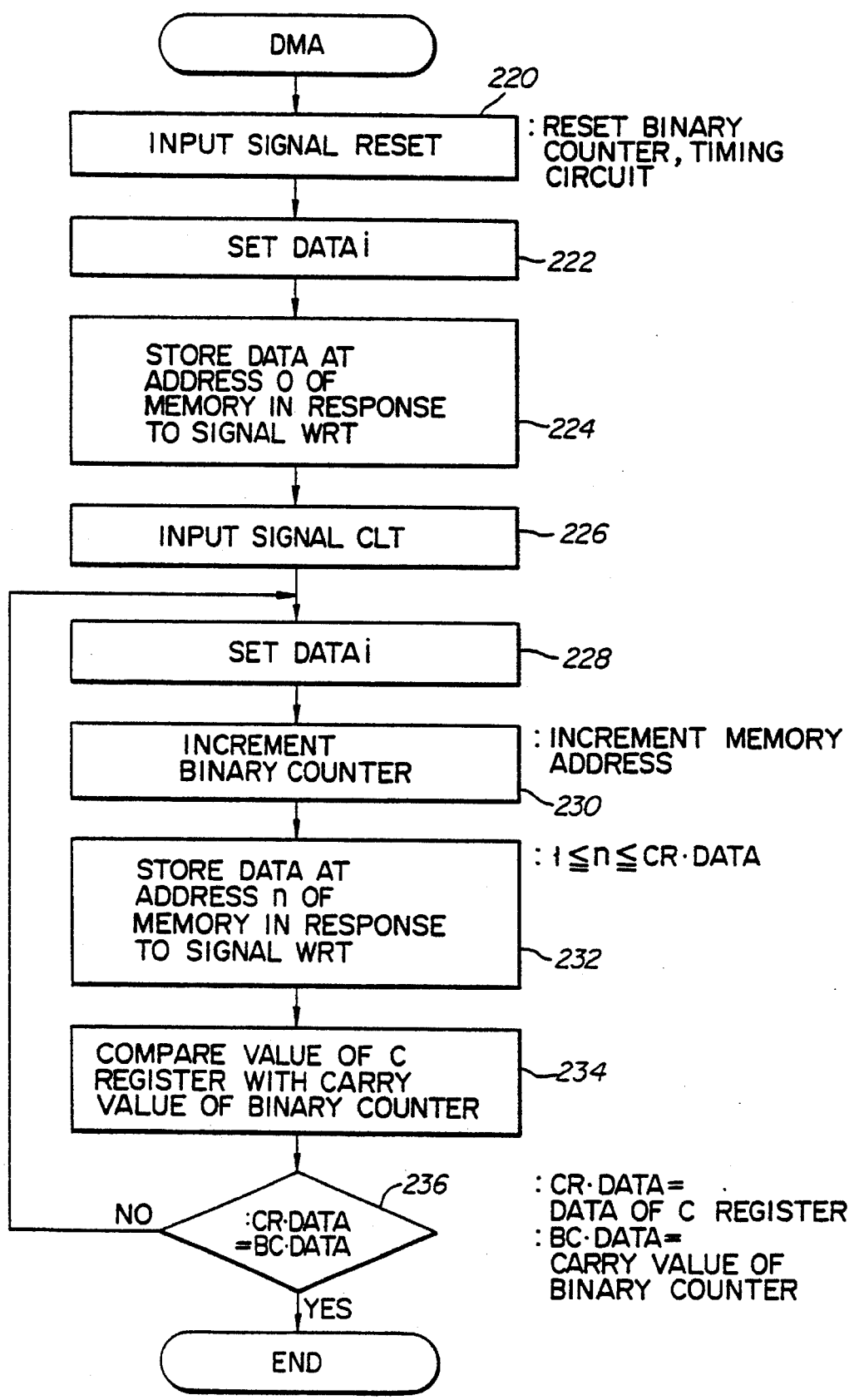
FIG. 14 is a flow chart showing a sequence for storing membership function definition parameters in a memory unit.

FIG. 14 is a flow chart showing a sequence for storing the carry value of the binary counter 44 in one of the memory units $M_1$ to $M_{15}$ which is designated by the M register 43, and for storing membership function definition parameters input to the external input terminal DATAi in each memory unit having an address selected by a decode output from the address decoder 22 in which the carry value is input. In other words, the inflection points ($X_O$, $X_L$, $X_R$) and slopes ($k_1$, $k_2$, $k_3$, $k_4$) as membership function defining parameters, and the label selected by the multiplexer 21 (FIG. 4B) are stored per rule according to the flow chart. The binary counter 44 is initialized in step 220 by an external signal RESET. The membership function definition parameter of a rule 0 is then stored in the memory unit at address 0 per steps 222 and 224. The binary counter 44 is incremented per steps 226, 228 and 230 upon reception of an external signal CLK so as to designate the memory unit at address 1. Similarly, the membership function definition parameters of a rule 1 are stored in the designated memory unit, per step 232. This operation is repeated up to an address N corresponding to a preset rule count N. When it is determined by steps 234 and 236 that the value of the C register 42 and the carry value of the binary counter 44 coincide with each other, the operation is stopped.

Figure 13:
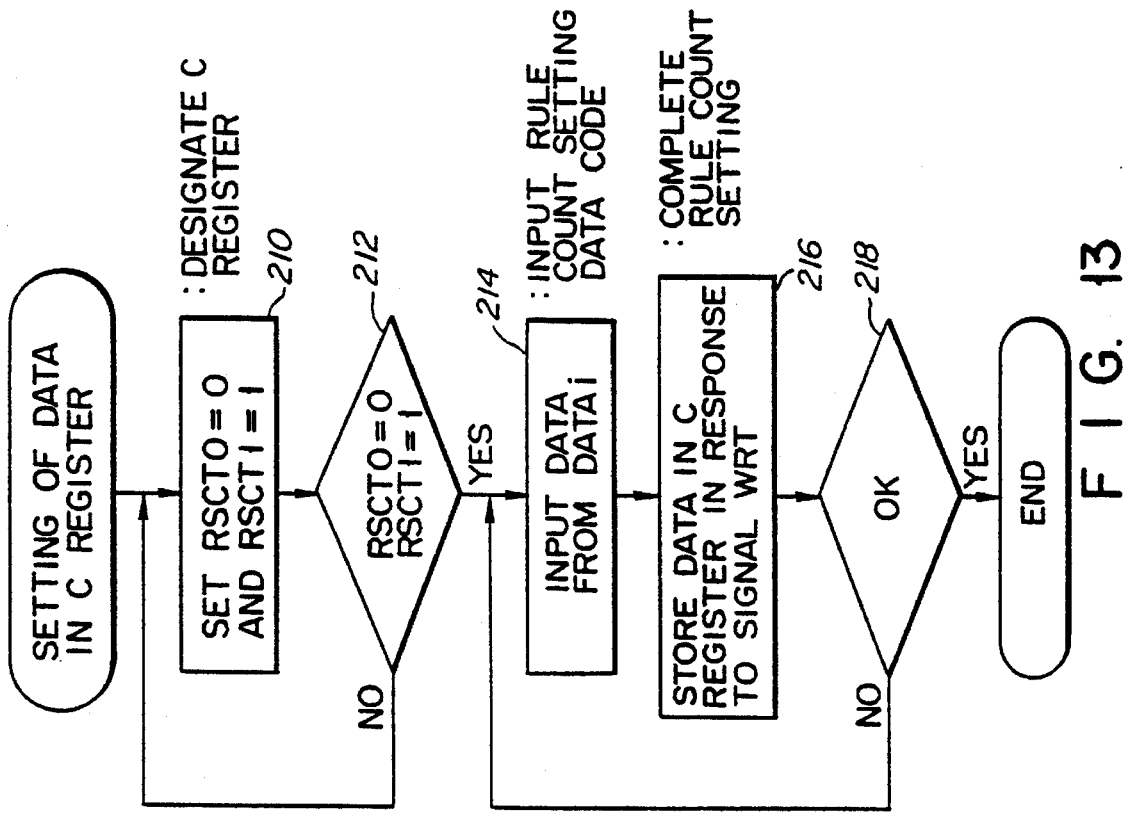
FIG. 13 is a flow chart showing a sequence for storing a rule count setting data code in a C register of the sequence controller through the external input terminal.
Figure 12:
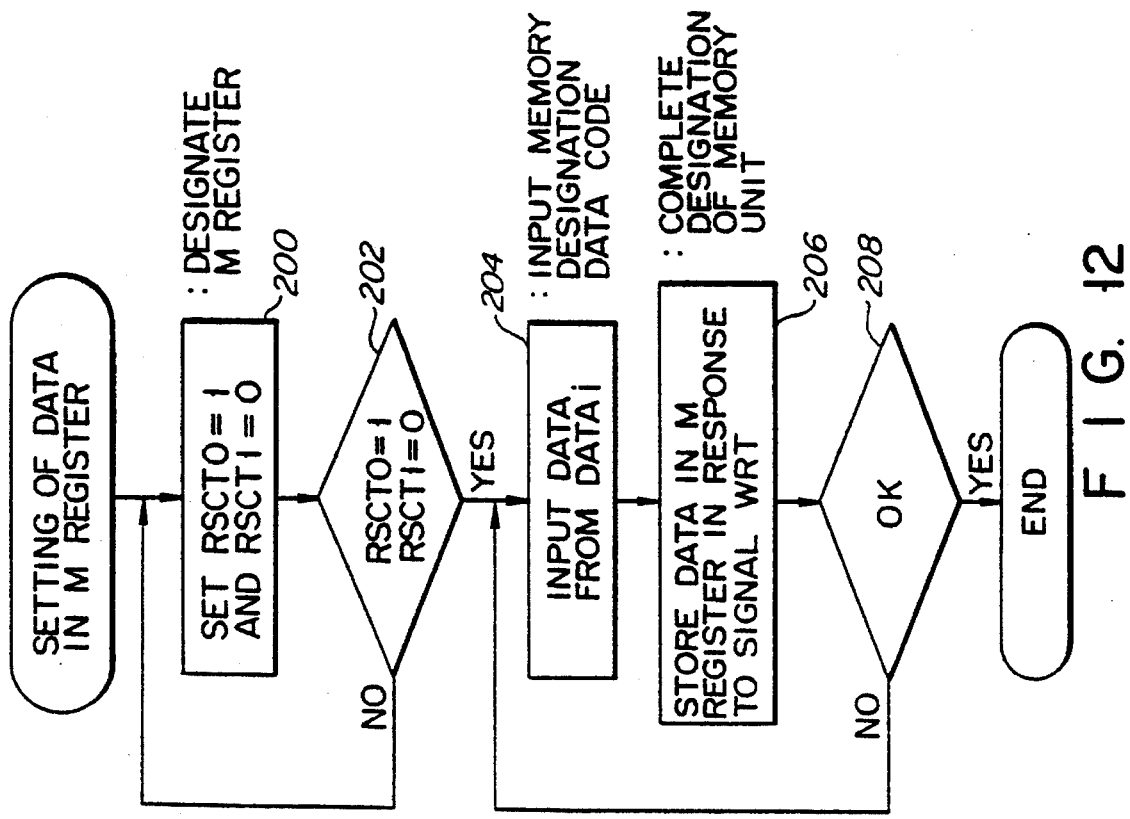
FIG. 12 is a flow chart showing a sequence for storing a memory unit designation data code in an M register of the sequence controller through an external input terminal.

As is apparent from the above description, write processing of membership function definition parameters with respect to the memory units $M_1$ to $M_{15}$ is performed such that designation of a memory unit and that of a rule count are respectively performed in accordance with the flow charts shown in FIGS. 12 and 13, and the write processing is executed in accordance with the flow chart in FIG. 14.

In practice, the memory groups 19 for storing parameters for defining a membership function are constituted by RAMs most often. Also, the use of EEPROMs, mask ROMs, and the like is possible for formation into an IC.

The data of the C register 42 in the sequence controller 23 can be used for DMS (direct memory access) and time-divisional fuzzy inference without updating unless the number of rules is changed. Data write processing with respect to the memory group 19 can be performed by combining a data setting operation of the M register 43 and the flow chart of DMA.

Figure 20A:
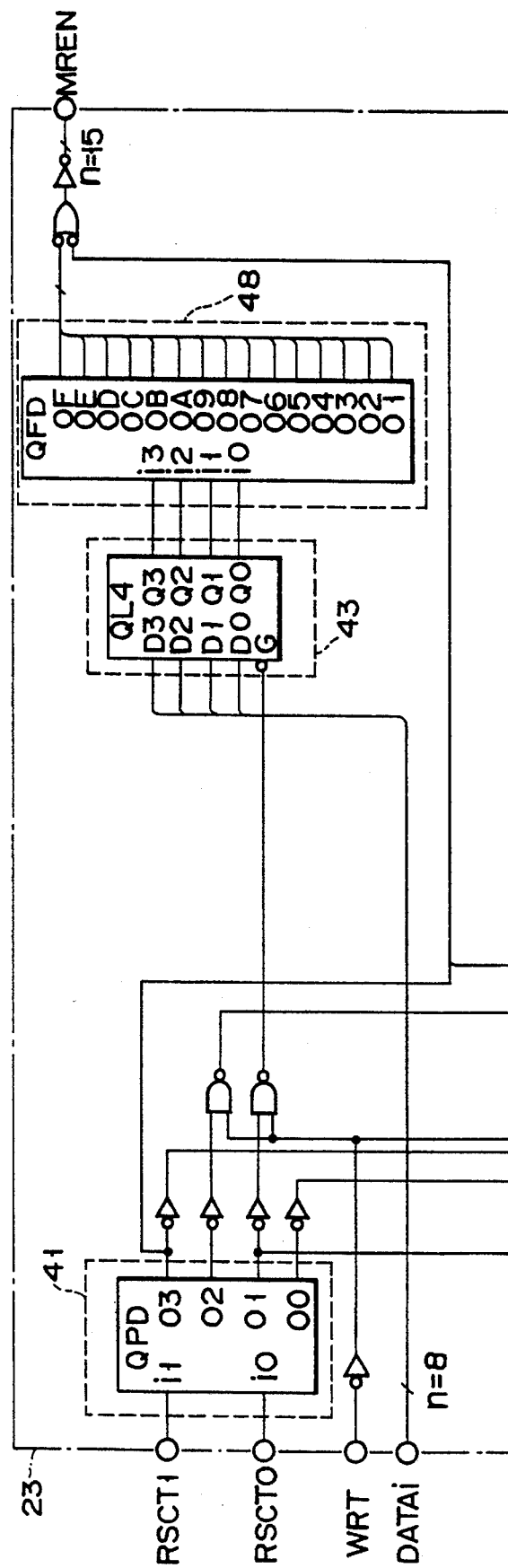
FIGS. 20A and 20B show in detail the internal circuit figuration of the sequence controller 23 shown in FIG. 4A.
Figure 20B:
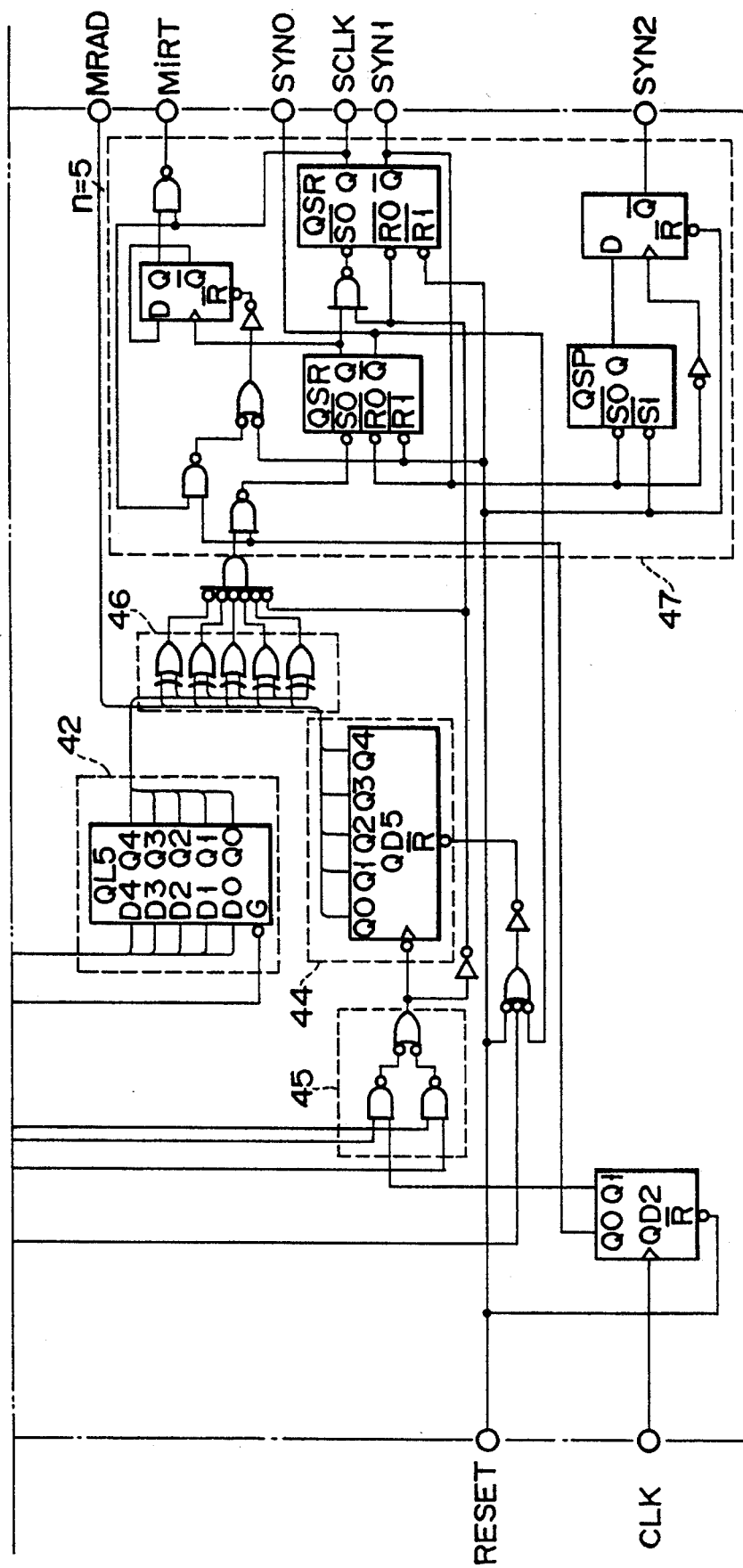

FIGS. 20A and 20B show in detail the internal circuit configuration of the sequence controller (i.e., a logical circuit) 23 shown in FIG. 4A. Each of the external output/input terminals shown in FIGS. 20A and 20B has a one-to-one correspondence to the sequence controller shown in FIG. 4A, except that RSCT of FIG. 4A corresponds to RSCT1 and RSCT0 of FIGS. 20A and 20B, and SYN of FIG. 4B corresponds to SYN2, SYN1 and SYN0 of FIG. 20A. The internal signals include four signals, namely, signals MREN, MRAD, MiRT and SCLK. Signal MREN is a memory unit designation signal output by a memory direct recorder 48, and one of memories 1(M1) to 15(M15) of FIG. 4A is selected in accordance with signal MREN. Signal MRAD is an output of the binary counter 44, and the addresses (OO[H] to 1F[H]) of each of memories 1(M1) to 15(M15) are sequentially accessed on the basis of signal MRAD. It should be noted that in FIGS. 20A and 20B, the binary counter 44 is depicted as a 5-bit binary up-counter QD5. Signal MiRT is clock signal which is supplied to either element 16 shown in 4B (to be more specific, CLK of the FF circuit group 32 shown in FIG. 10) or element 170 shown in FIG. 18 (to be more specific, CLK of registers $170_1$–$170_7$ shown in FIG. 19). The clock signal corresponds to the MAX register strobe signal referred to in the flowchart shown in FIG. 16. Signal SCLK is a clock signal which is supplied to each of the latches 1 and 2 of element 18 shown in FIG. 4A (to be more specific, CLK of element 18 shown in FIG. 29A). The clock signal corresponds to the latch strobe signal referred to in the flowchart shown in FIG. 16.

The circuit configuration shown in FIGS. 20A and 20B will now be described in more detail.

Figures 21A, 21B:
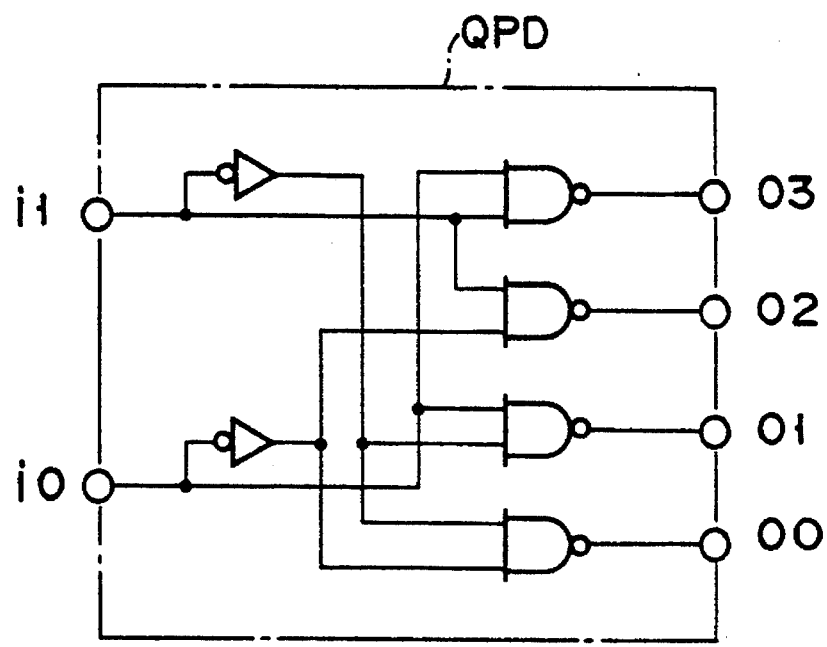
FIG. 21A shows a 2–4 line decoder and FIG. 21B is a table illustrating the function thereof.

A register direct recorder 41 is constituted by the decoder (QPD) shown in FIG. 21A. The register direct recorder provides the sequence controller 23 with the function shown in FIG. 11 by setting the codes shown in FIG. 21B with reference to inputs i1 (RSCT1) and i0 (RSCT0).

C-register 42 is constituted by the latch (QL5) shown in FIG. 23A. C-register 42 stores the data which is input from DATAi in accordance with the function diagram shown in FIG. 11. The data stored in C-register 42 represents the final-address value indicating that position of each memory unit (M1–M15) at which parameter data is stored in the DMA operation mode of the apparatus. The data stored in C-register 42 represents the final-rule address value (rule number) when a time-divisional fuzzy control is performed. FIG. 23B is a table illustrating the function of the latch.

M-register 43 is constituted by the latch (QL4) shown in FIG. 26A. M-register 43 stores the data which is input from DATAi in accordance with the function diagram shown in FIG. 11. The data stored in M-register 43 represents a value indicating which memory unit should be selected out of memory units M1–M15. The value set in M-register 43 is a 4-bit binary value corresponding to inputs i3–i0 indicated in FIG. 22B. In the time-divisional fuzzy control mode, data O(H) is set in M-register 43, so that all the outputs of the memory direct recorder 48 are "H". FIG. 26B is a table illustrating the function of this M-register.

A binary counter 44 is constituted by the 5-bit binary counter (QD5) shown in FIG. 24A. When data is written or read, the binary counter 44 designates an address (OO[H] to 1F[H]) of memory units M1–M15. FIG. 24B is a table illustrating the function of this binary counter.

Figures 25A, 25B:
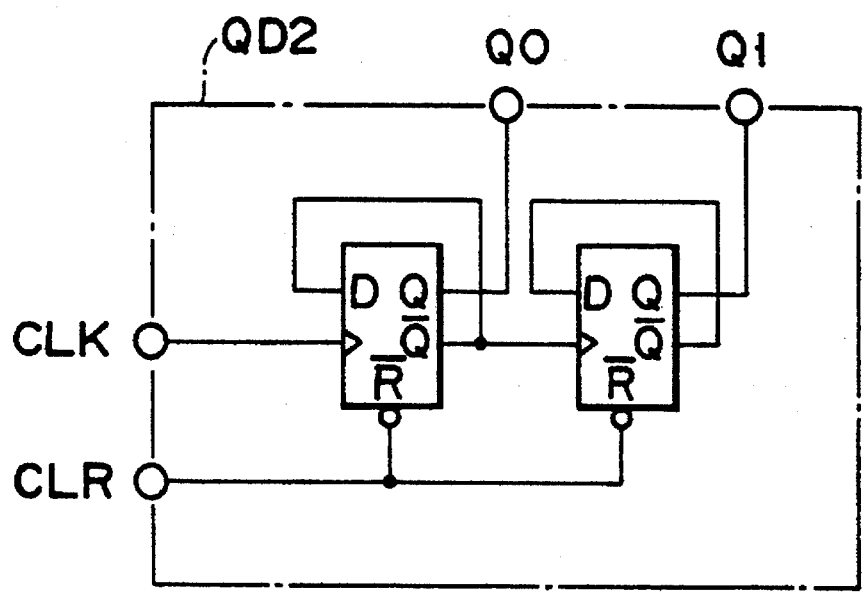
FIG. 25A shows a 2-bit binary counter.
FIG. 25B is a table illustrating the function thereof.

The binary counter 44 is used in both the direct memory access (DMA) mode and the fuzzy control mode (FIG. 11), so that an AND gate 45 selects one of CLK (the frequency of which divided into ¼ by QD2 shown in FIG. 25A per the table shown in FIG. 25B) and WRT in accordance with the output of the register direct decoder 41.

An EOR gate 46 compares the value set in C-register 42 (i.e., the final-address value indicating that position of memory unit (M1–M15) at which parameter data is stored) with the carry value of the binary counter 44. In the case where the output value of C-register 42 coincides with the output value of the binary counter 44 (in this case, all the outputs of the EOR gate 46 are "L"), a coincidence signal is supplied to a timing circuit 47.

Figures 27A, 27B:
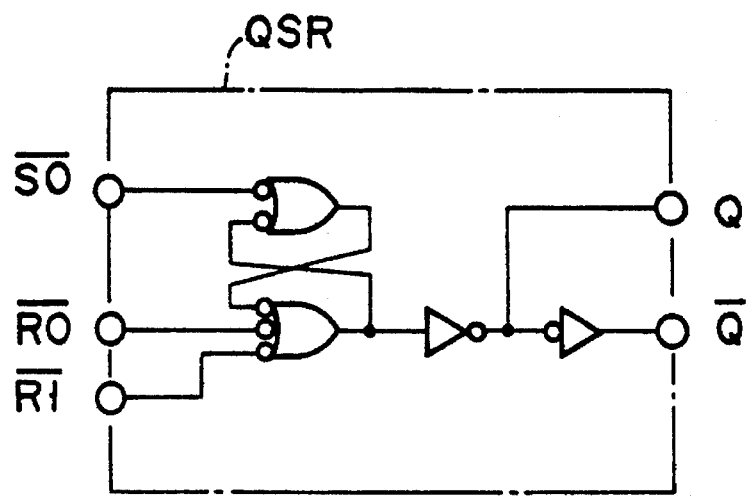
FIG. 27A shows a reset-priority type SR flip-flop (1-set, 2-resets)
FIG. 27B is a table illustrating the function thereof.
Figures 28A, 28B:
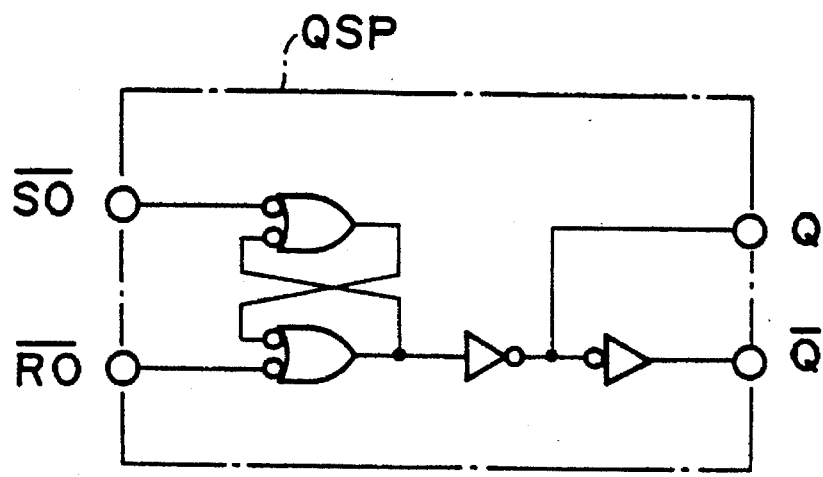
FIG. 28A shows a reset-priority type SR flip-flop (1-set, 2-resets)
FIG. 28B is a table illustrating the function thereof.

In synchronism with the coincidence signal supplied from the EOR gate 46, the timing circuit 47 outputs a synchronization signal SYNO. This synchronization signal SYNO corresponds to the center-of-gravity calculation output strobe signal referred to in FIG. 16. After the output of synchronization signal SYNO, synchronization signals MiRT, SCLK, SYNI and SYN2 are output in accordance with the timings of the CLK. The output terminals of those signals denoted by SYNO, SYNI and SYN2 are particularly important so as to facilitate the interface between the subject digital fuzzy apparatus and a target system to be controlled by the digital fuzzy apparatus. In addition, the output terminals can be used as external monitor terminals when the operation is confirmed. FIG. 27A shows the circuitry of reset-priority type SR flip-flop QSR of timing circuit 47. FIG. 27B is a table illustrating the function of this SR flip-flop. FIG. 28A shows the circuitry of reset-priority type SR flip-flop QSP of timing circuit 47. FIG. 28B is a table illustrating the function of this SR flip-flop.

Figure 22A:
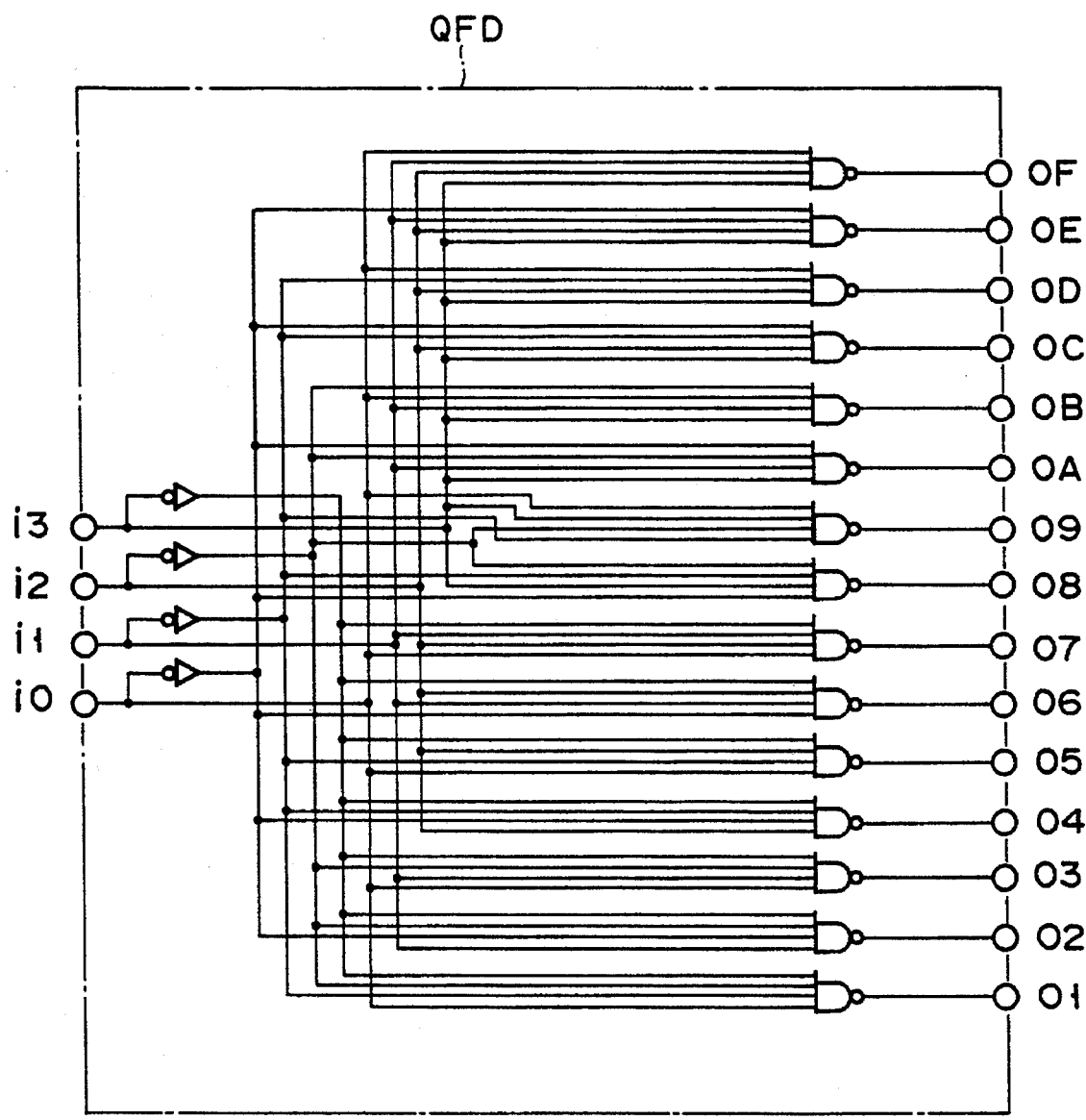
Figure 22B:
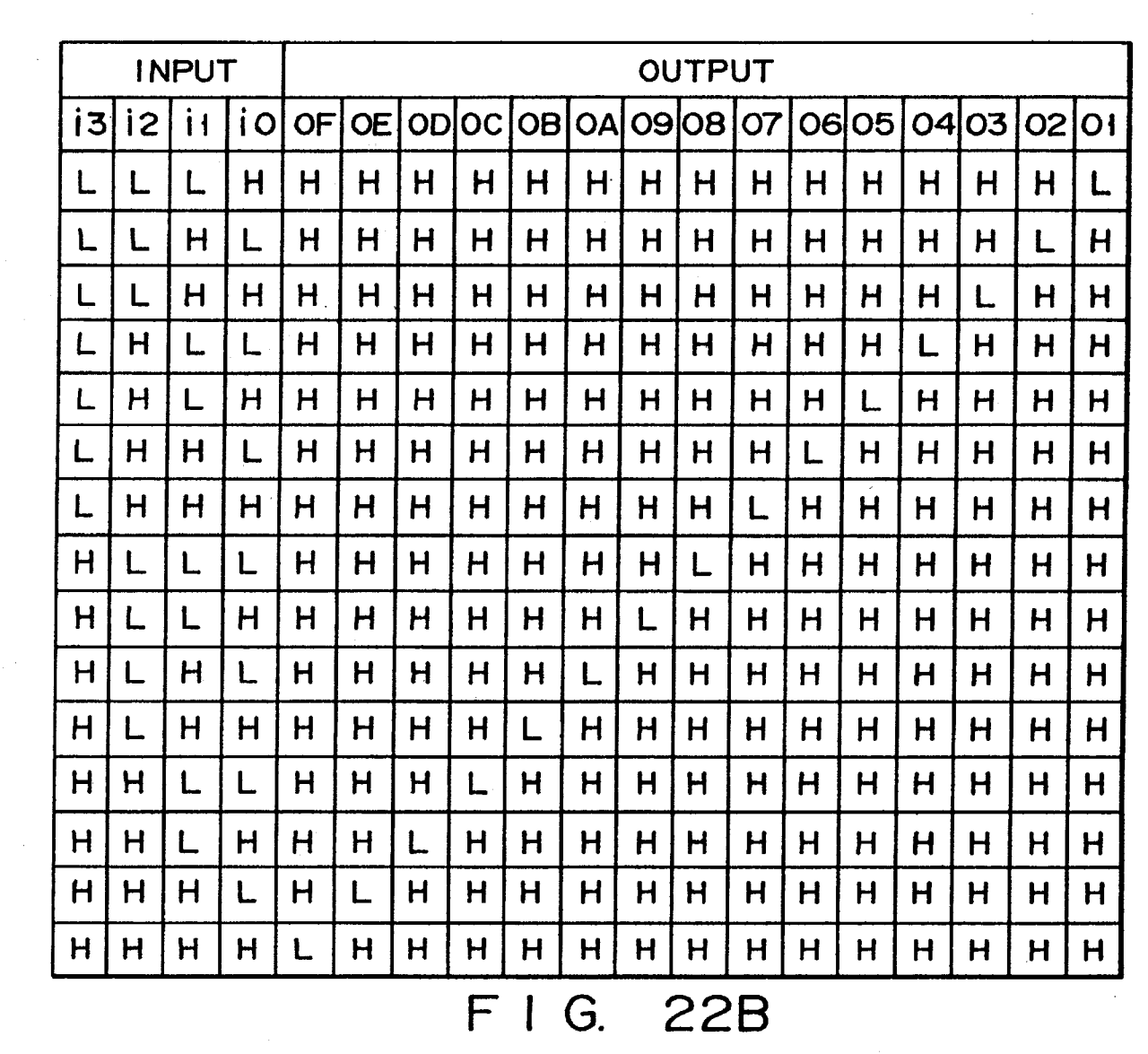
Figures 29A, 29B:
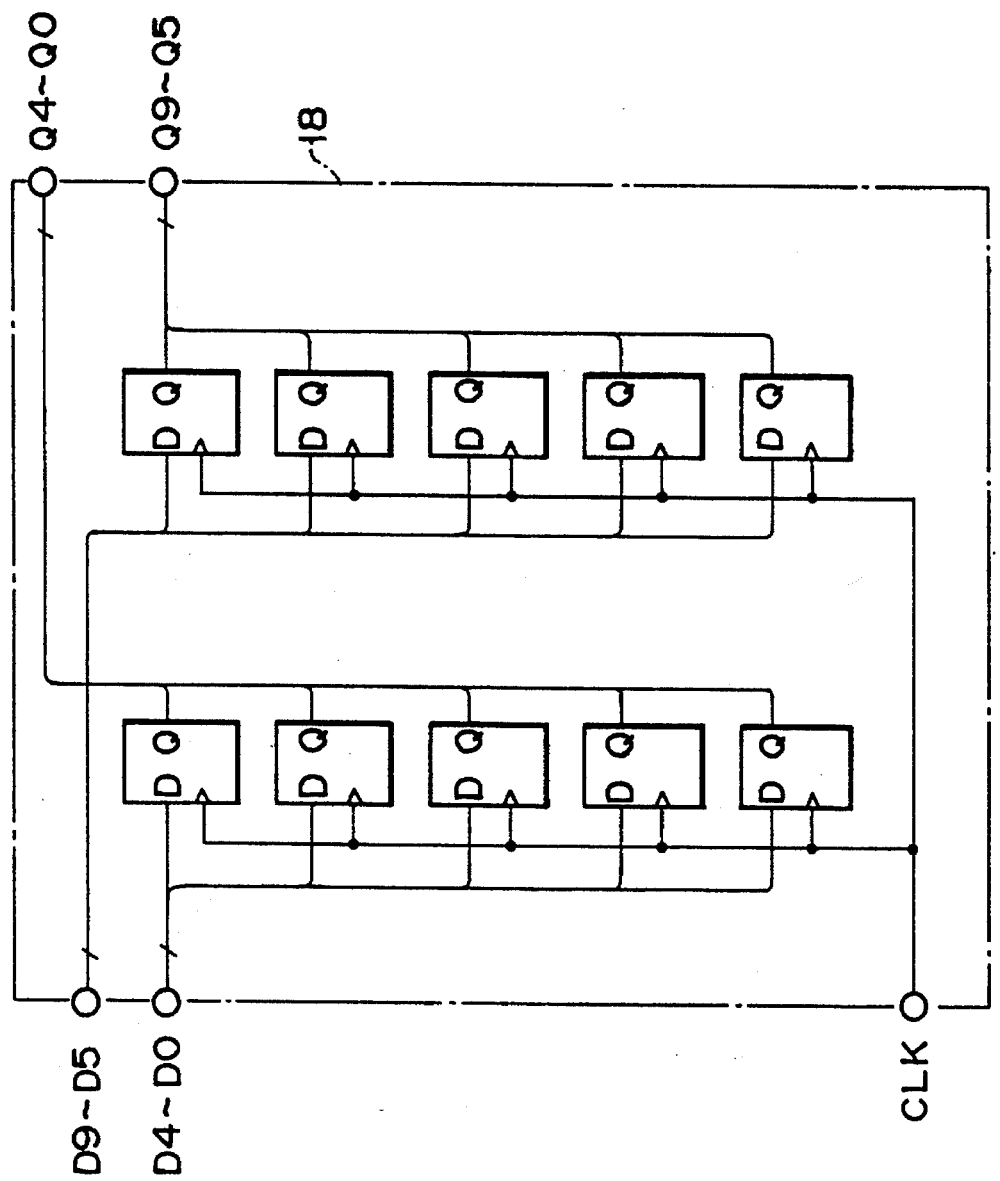
FIG. 29A shows the internal circuit which is included in latch group 18 and which comprises two 5-bit latch systems corresponding to Xil and XiO and each made by a DFF.
FIG. 29B is a table illustrating the function thereof.

The memory direct decoder 48 is constituted by the decoder (QFD) shown in FIG. 22A. The memory direct decoder 48 is a 4–16 line decoder, and memory units M1–M15 can be selectively designated by setting the codes shown in FIG. 22B to the memory direct decoder 48. An input to the memory direct decoder 48 is controlled in accordance with the output (i.e., a 4-bit binary value) of M-register 43. It should be noted that FIG. 22B does not show the case where i3=L, i2=L, i1=L and i0=L, since in this case the apparatus is set in the time-divisional fuzzy control mode. FIG. 29A shows the internal circuit which is included in latch group 18 and which comprises two 5-bit latch systems corresponding to Xi1 and Xi0 and each made by a DFF, and FIG. 29B is a table illustrating the function thereof.

Figures 30A, 30B:
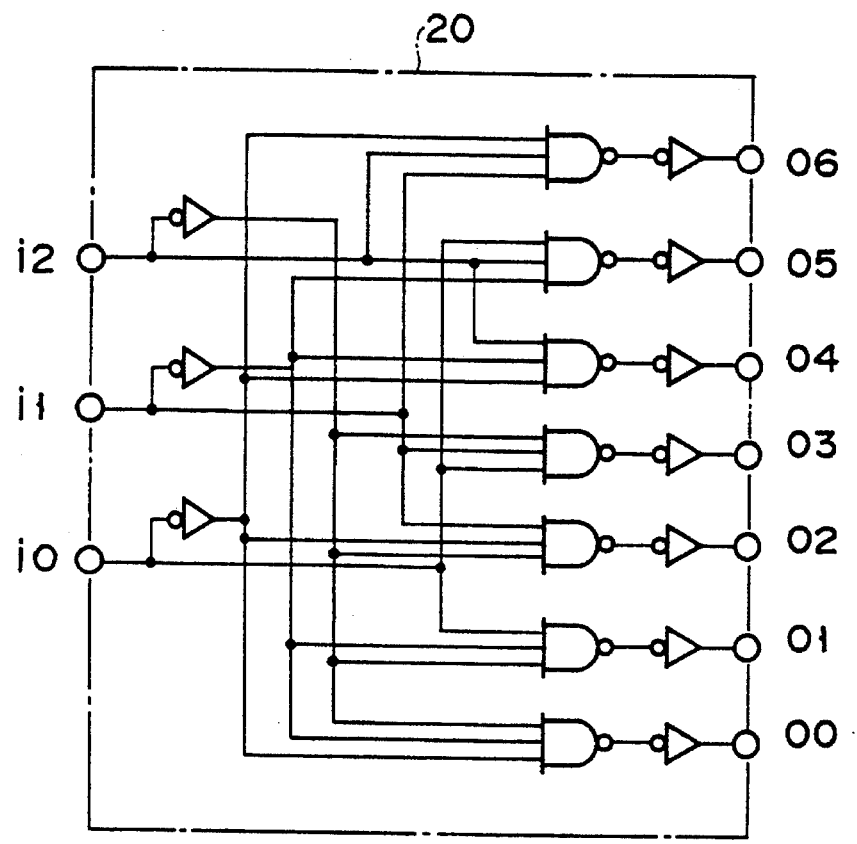
FIG. 30A shows the internal circuit of a line decoder 20.
FIG. 30B is a table illustrating the function thereof.

FIG. 30A shows a 3–7 line decoder. Outputs 00–06 are sequentially selected by inputting the codes shown in the truth table of FIG. 30B to input terminals i0–i2. The output selected is inverted from "L" state to "H" state.

Figure 31A:
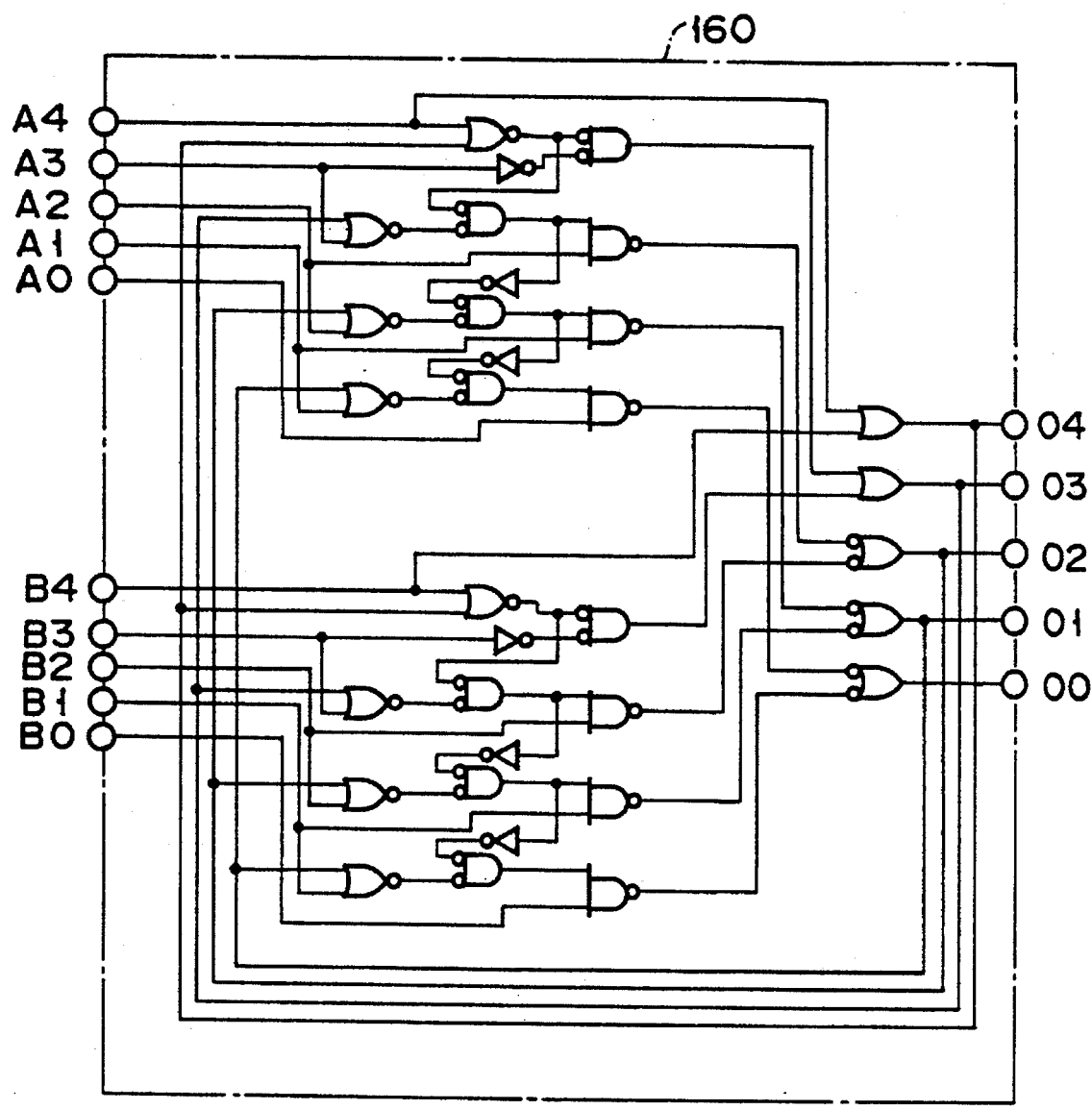
FIG. 31A shows the internal circuit of the maximum-value calculator 160.

FIG. 31A shows a 5-bit maximum-value calculator. The input bits A0–A4 are compared with their corresponding input bits B0–B4, and the larger bit is output to one of terminals 00–04. The main feature of the maximum-value calculator is that the bits A0–A4 and their corresponding bits B0–B4 are sequentially compared with each other in descending order (i.e. from the upper bits A4 and B4). When one of two bits is "H" (for example, A3=H, and B3=L), the magnitude relation therebetween is determined (i.e. A3>B3). When two bits are equal to each other (for example, A4=H, and B4=H; in other words, A4=B4), the lower bits are sequentially subjected to comparison. FIG. 31B is a truth table showing the above process.

Figure 32B:
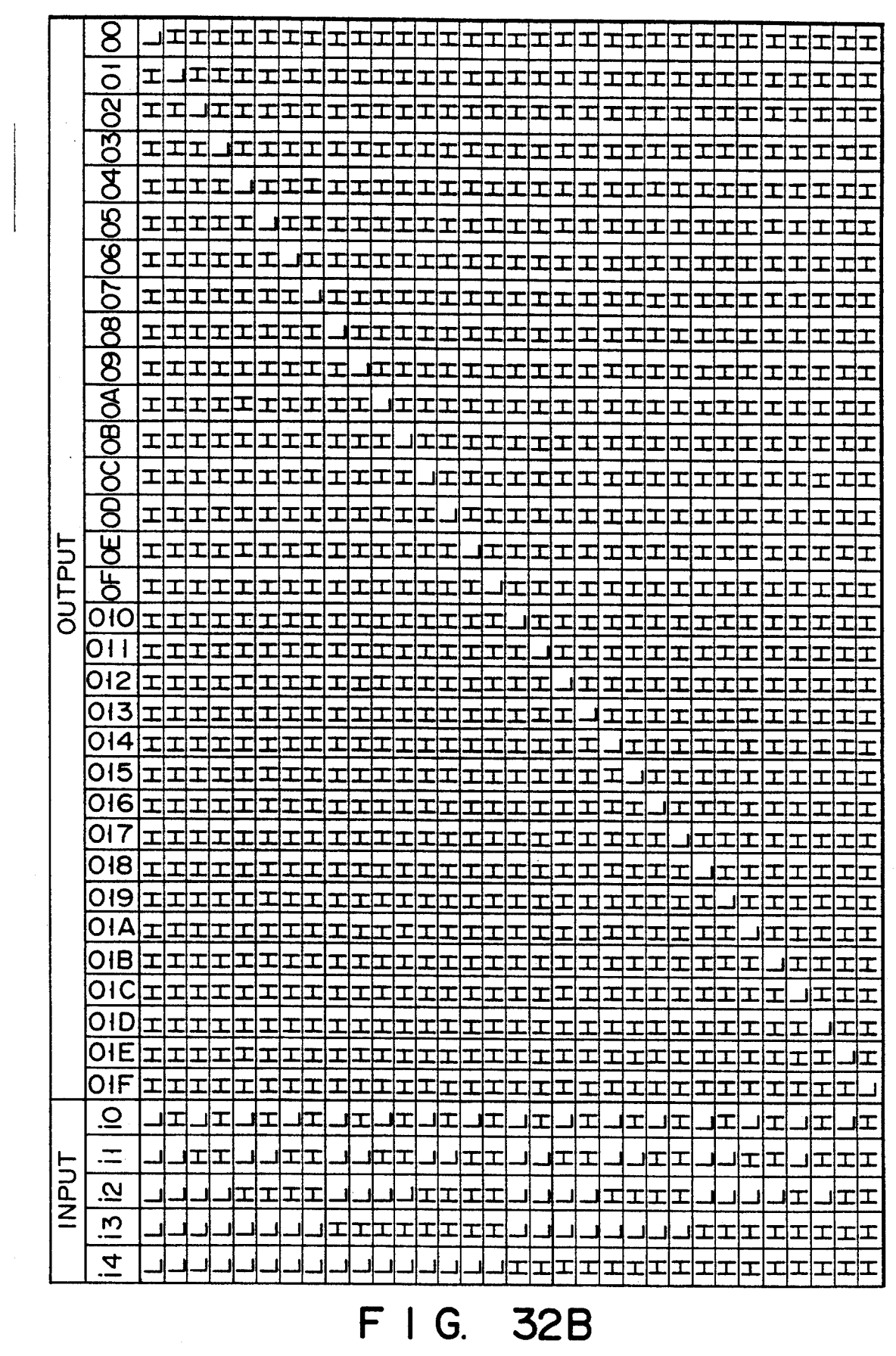

FIG. 32A shows a 5–32 line decoder including a combination of two 4–16 line decoders. Outputs 00–021F are sequentially selected by inputting the codes shown in the truth table of FIG. 32B to input terminals i0–i4. The output selected is inverted from "L" state to "H" state.

Figures 33A, 33B:
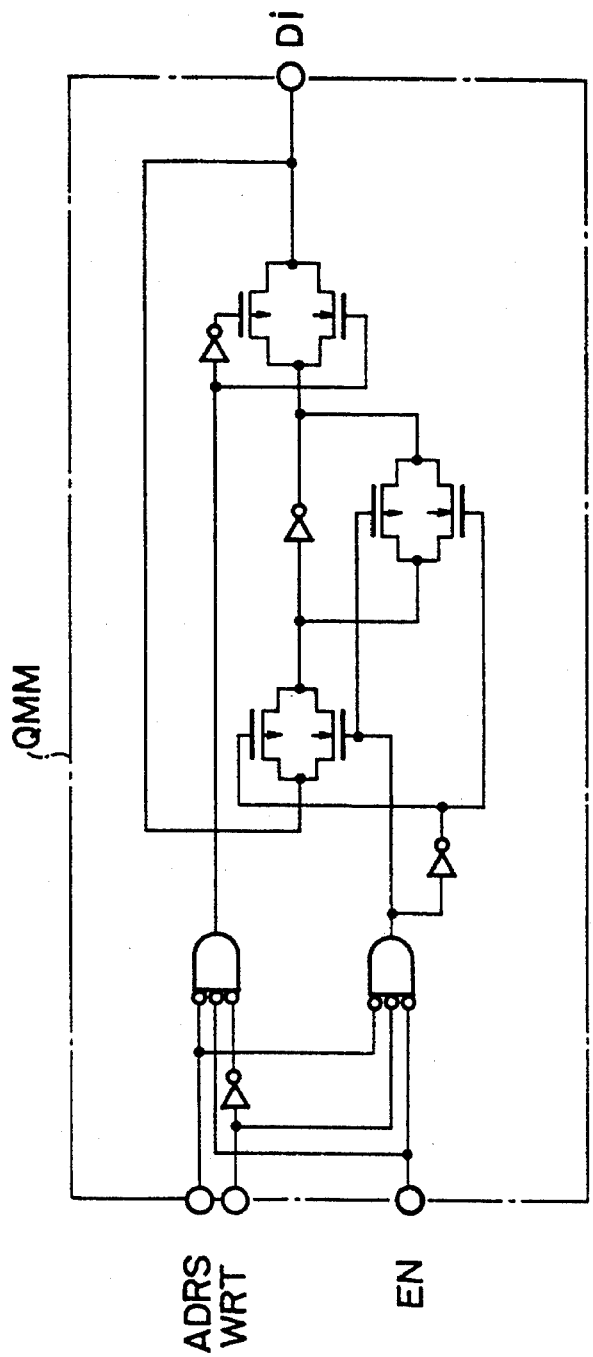
FIG. 33A shows the internal circuit corresponding to one of each memory unit (M1–M15)
FIG. 33B is a table illustrating the function thereof.

FIG. 33A shows the equivalent internal circuit of a 1-bit memory cell in memory units M1–M15. When inputs EN and ADRS are set at "L", the memory cell is selected and enters an active state. When input WRT is set at "H" at this time, a signal indicating the state ("H" or "L") of the latch of the internal equivalent circuit is output as Di from the internal equivalent circuit. When input WRT is set at "L", data indicating the state ("H" or "L") of input/output Di is held in the latch of the internal equivalent circuit. When input EN is in "H" state, the memory cell is inactive. FIG. 33B is a truth table showing the above states.

Figure 34:
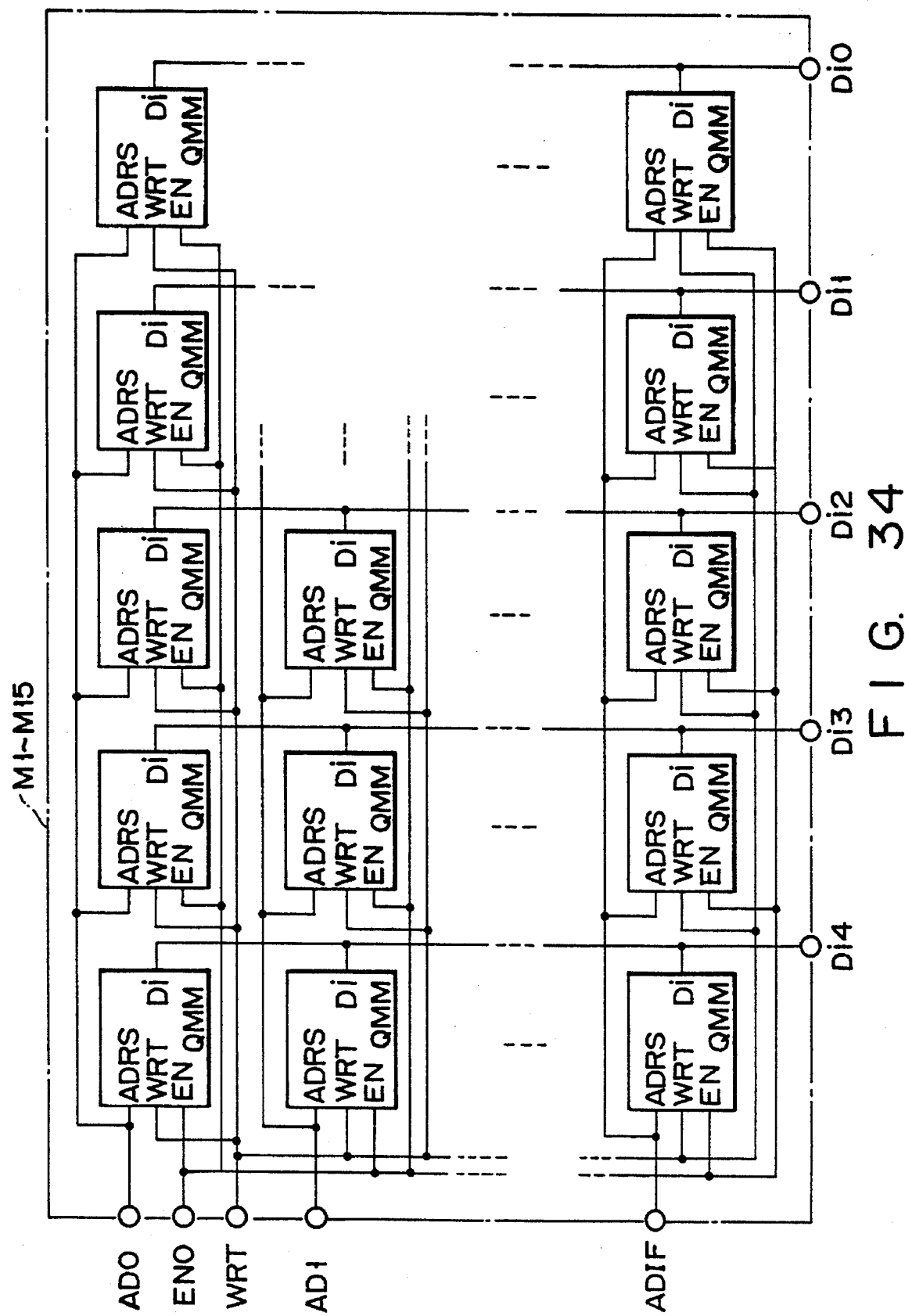
FIG. 34 shows the internal circuit of each memory unit (M1–M15), wherein a one-bit portion is constituted by an OMM which has a storage capacity of 5 bits×32 words, so that the parameter data corresponding to 32 rules can be stored, with parameter data corresponding to one rule being expressed by 5 bits.

FIG. 34 is the internal circuit constituting one of memory units M1–M15. As can be seen in FIG. 34, this internal circuit includes a plurality of macro cells QMM's, one of which is shown in FIG. 33A, and each of the macro cells is designed to output a 1-bit signal so as to realize 5 bit×32 word memory-capacity. In short, a parameter data item corresponding to one rule is represented by 5 bits, and parameter data corresponding to thirty-two rules are stored.

Figure 35:
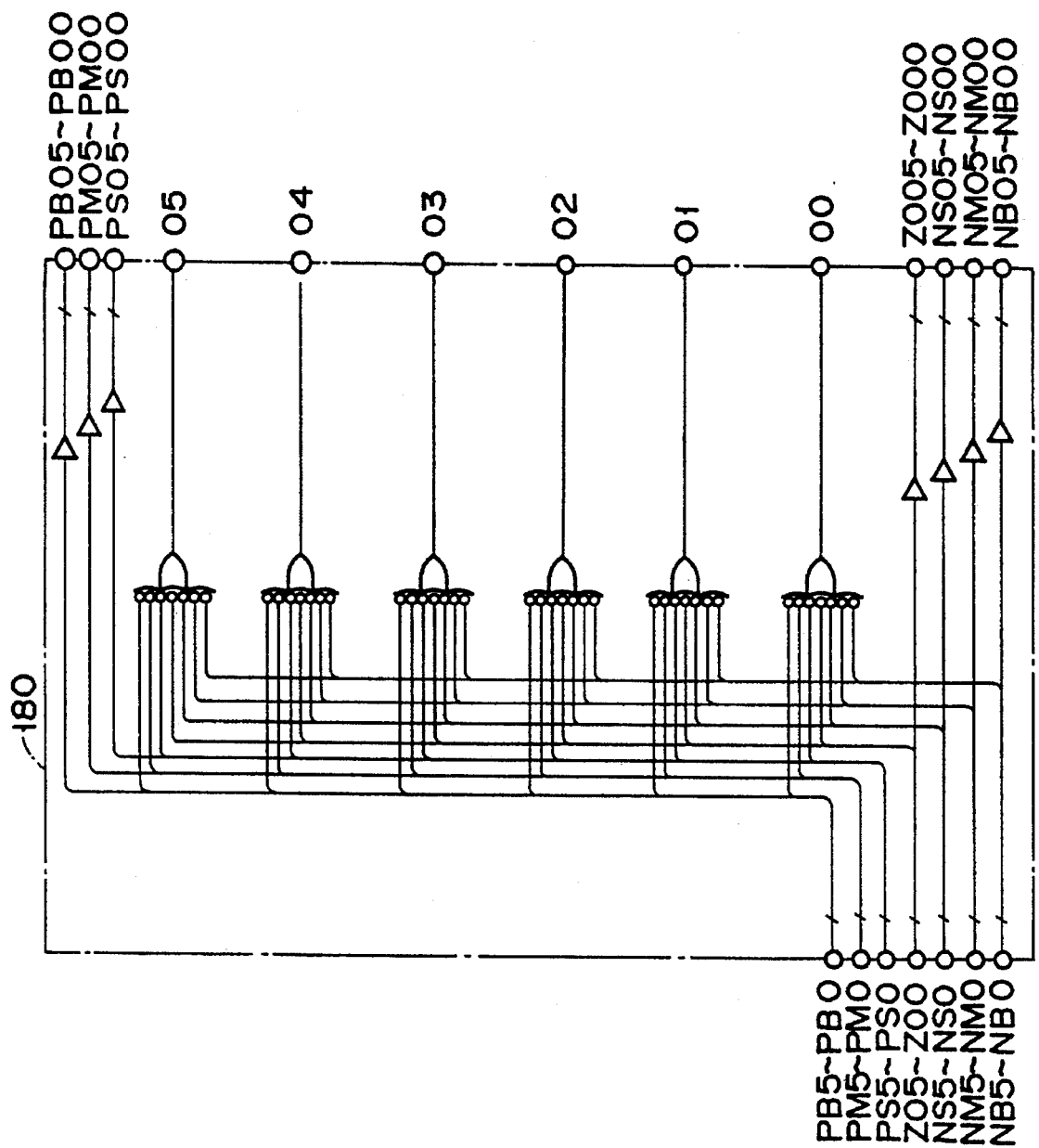
FIG. 35 shows the internal circuit of a multiplexer 180.

FIG. 35 shows the internal circuit of multiplexer 180. Input data items, i.e. PB5–PB0, PM5–PM0, PS5–PS0, ZO5–ZO0, NS5–NS0, NH5–NH0, and NB5–NB0, are decoded using six NAND gates, and are thereafter output to terminals 00–05. More precisely, the bits constituting the respective input data items are input each to a corresponding one of terminals 00–05 in ascending order. In the case of input data items PB5–PB0, for example, PB0 (the least significant bit) to PB5 (the most significant bit) are input in this order to terminals 00 to 05, respectively. Terminals (PB05–PBO0) to (NB05–NBO0) receive input data items (PB5–PB0) to (NB5–NB0) through buffers.

Figure 15:
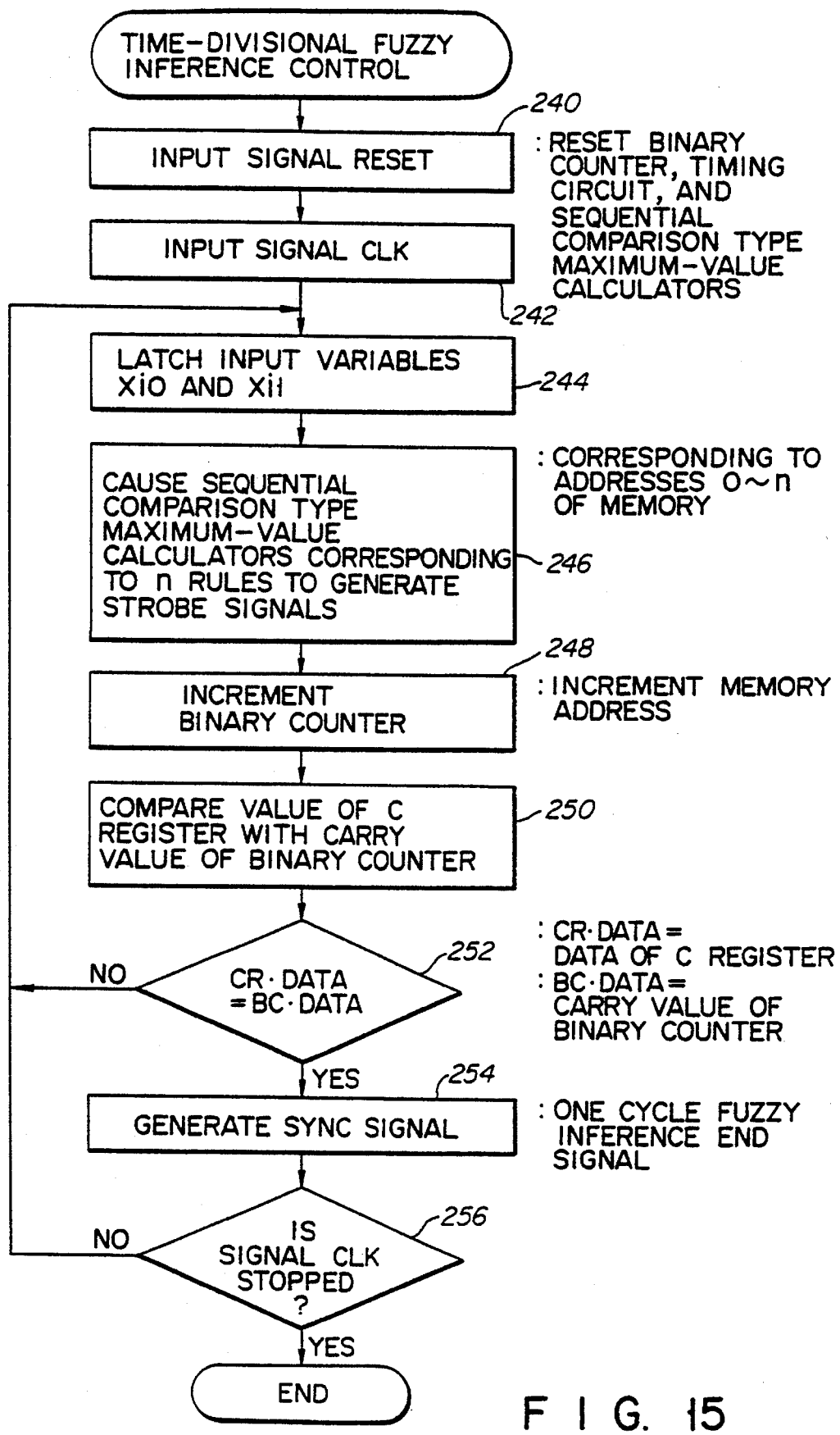
FIG. 15 is a flow chart for explaining an actual operation of fuzzy inference based on time-divisional control.

A fuzzy inference operation based on time-divisional control will be described below. FIG. 15 is a flow chart showing a sequence of fuzzy inference based on time-divisional control. FIG. 16 is a timing chart for the sequence. Upon reception per step 240 of a reset signal RESET, the binary counter 44, the timing circuit 47, and the maximum-value calculator 16 are initialized.

When input of a clock signal CLK is started per step 242, the timing circuit 47 and the binary counter 44 are activated, and the latch group 18 holds input variables xi0 and xi1 per step 244. These input variables xi0 and xi1 are held until one cycle of fuzzy inference is completed. The addresses (0 to n) of the memory group 19 respectively correspond to rules 0 to n. A rule is determined by a specific address of the memory group 19 which is accessed by the timing circuit 47.

Inference of each rule is held per step 246 in a corresponding sequential comparison type maximum-value calculator for a then-part membership function designated for each rule. This repetitive rule selecting operation is performed until the access address of the memory group 19 is incremented upon incrementation of the binary counter 44 per step 248, and the contents of the C register 42 and the carry value of the binary counter 44 are determined per steps 250 and 252 to coincide with each other. When the contents of the C register 42 and the carry value of the binary counter 44 coincide with each other, it means that one cycle of fuzzy inference is completed, and an output value from the center-of-gravity calculator 17 which is output, per step 256, at the timing at which a sync signal SYN is generated, per step 254, is used as an inferential result.

In the above-described time-divisional control, the maximum-value calculator is designed such that the digital comparators 31 and the FF circuit groups 32, i.e., register circuits, are arranged in one-to-one correspondence with a total of seven labels ranging from PB to NB ($16_1$ to $16_7$). with this arrangement, when a circuit size is considered at the gate level, logical redundancy is caused, resulting in a redundant circuit arrangement.

A maximum-value calculator according to another embodiment of the present invention will be described below, which eliminates such a drawback. According to this calculator, in a fuzzy inference apparatus based on time-divisional control which is designed to be formed into an IC, the gate efficiency can be greatly improved.

Figure 17:
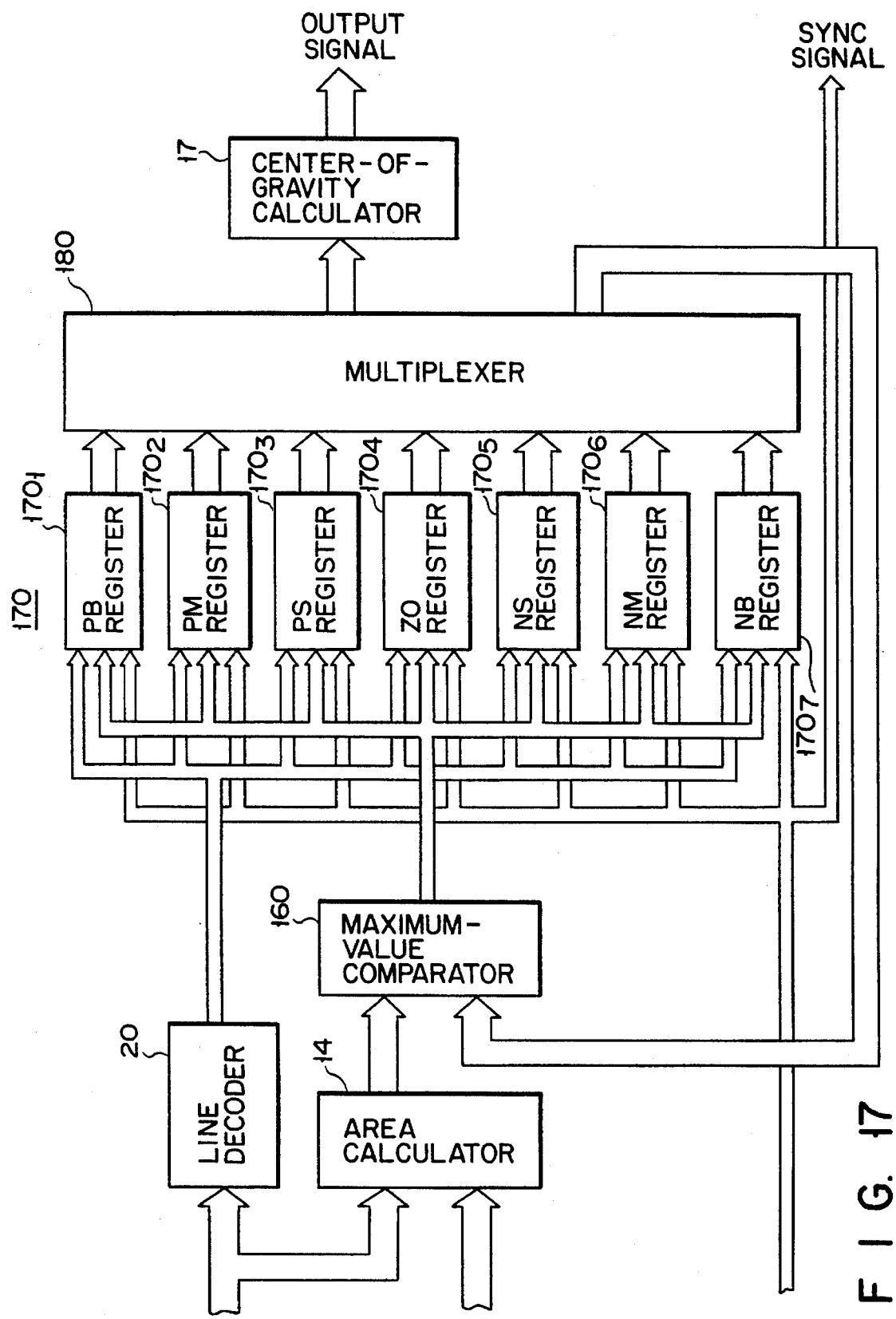

FIG. 17 is a block diagram showing an arrangement which more rationally facilitates integration of a block constituted by the area calculator 14 and the subsequent components shown in FIG. 3 as an IC. As described above, a maximum-value calculator 16 includes sequential comparison type maximum-value calculator units (FIG. 4B) arranged in one-to-one correspondence with a total of seven labels ranging from PB to NB. Each sequential comparison type maximum-value calculator unit comprises a FF circuit group (FIG. 10) and a digital comparator (FIG. 9).

As shown in FIG. 17, in this embodiment, one maximum-value comparator 160 is arranged at the output stage of an area calculator 14. A register group 170 of PB to NB ($170_1$ to $170_7$) is arranged at the output stage of the maximum-value calculator 160. In addition, a multiplexer 180 is arranged at the output stage of the register group 170. An output from the multiplexer 180 is supplied to a center-of-gravity calculator 17, and is fed back to the maximum-value calculator 160 through a different route. Each register of the register group 170 has a circuit arrangement shown in FIG. 19. This circuit arrangement is similar to that shown in FIG. 10, but is different therefrom in that an AND gate group (AND 1 to AND 6) is arranged at the output stage of an FF circuit group ($F_{10}$ to $F_{15}$) in one-to-one correspondence, and a signal from an input terminal CEN is input not only to an gate AND 7 but also to the AND gate group.

In addition, an output from the maximum-value comparator 160 in FIG. 17 corresponds to input terminals D0 to D5 of the register group 170 in FIG. 19, an output from a line decoder 20 in FIG. 17 corresponds to an input terminal CEN in FIG. 19, and a sync signal in FIG. 17 corresponds to an input terminal CLK in FIG. 19. Note that an input terminal CLR in FIG. 19 is not shown in FIG. 17.

An operation of the circuit having the above-described arrangement will be described blow.

An output from the maximum-value comparator 160 is commonly input to the registers ($170_1$ to $170_7$) of the register group 170 which respectively correspond to the labels PB to NB. Outputs from the registers $170_1$ to $170_7$ are input to the maximum-value calculator 160 again through the multiplexer 180 so that maximum-value comparison is performed between the values held in the register group 170 and a new input value output from the area calculator 14. The comparison result is held in the register group 170.

Referring to FIG. 19, when the input terminal CEN is at "H" level, the AND condition of each AND gate is satisfied, and an output signal from the Q output terminal of each of the FF circuits $F_{10}$ to $F_{15}$ appears at a corresponding one of output terminals Q5 to Q0. When the input terminal CEN is at "L" level, the values of the input terminals D5 to D0 are not held in the FF circuits $F_{10}$ to $F_{15}$, and all the values of the output terminals Q5 to Q0 are fixed at "L" level. That is, an output value from a register designated by the line decoder 20 is fed back to the maximum-value comparator 160, and the register holds a result obtained by performing maximum-value comparison between the previous maximum value (register output value) and a new input value, thus performing maximum-value calculation. Other operations are performed in the same manner as in the FF circuit group in FIG. 10.

Figure 18:
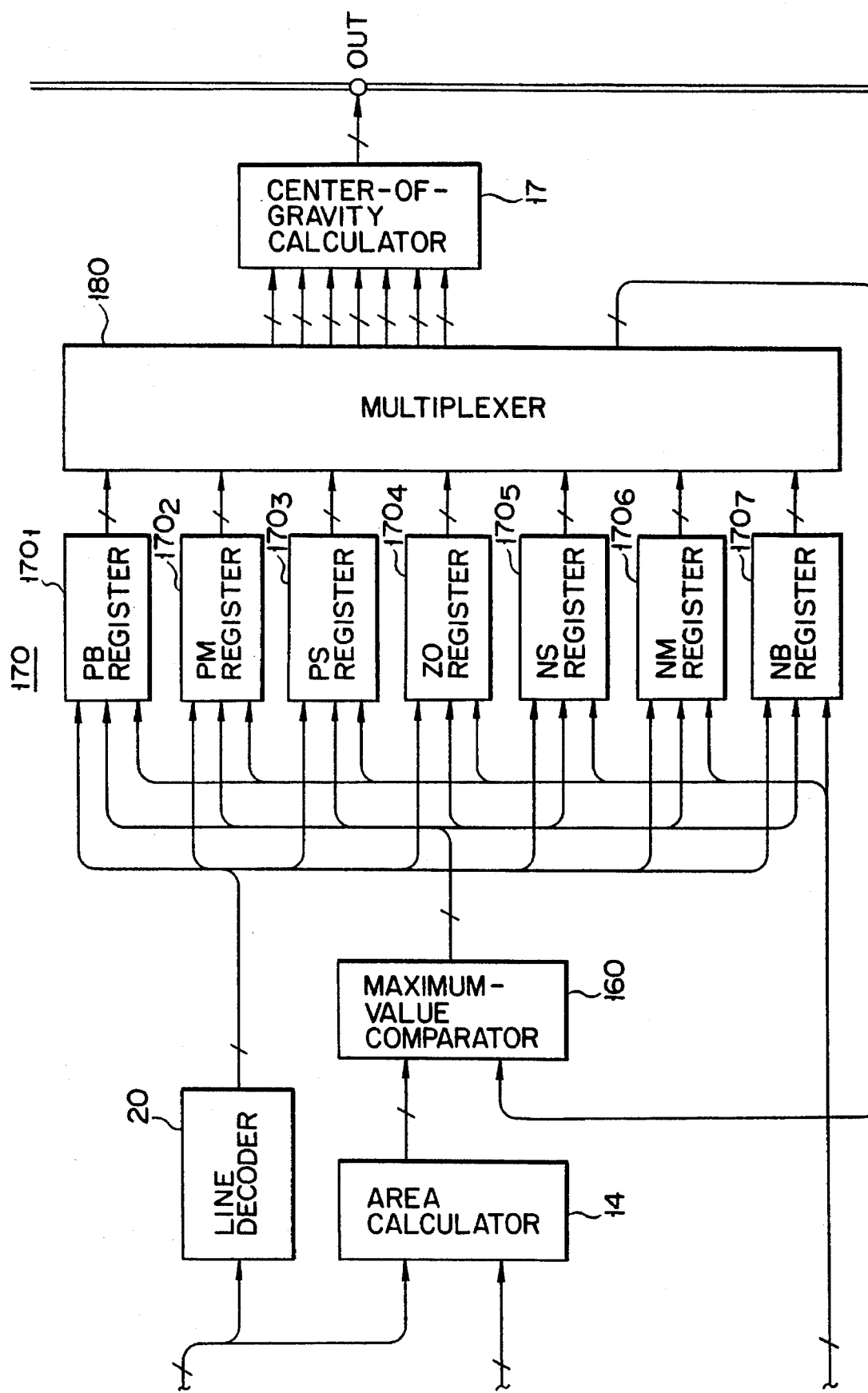

FIG. 18 is a block diagram showing an actual operation circuit corresponding to the circuit in FIG. 17.

As has been described in detail above, according to the present invention, since fuzzy inference of each rule can be performed by time-divisional control, the circuit arrangement can be greatly simplified, and the circuit size can be greatly reduced. This facilitates formation into an IC. In addition, the number and conditions of rules can be easily changed by updating the contents of the parameter storage means, thereby providing a versatile digital fuzzy inference apparatus.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A digital fuzzy inference apparatus comprising:

latch means for latching a plurality of input signals simultaneously and holding said input signals over one inference period;

a set of fuzzy rule operation means for performing operations of fuzzy rules constituted by membership functions;

parameter storage means for storing parameters as a plurality of sets of parameters used for defining the membership functions of said fuzzy rule operation means;

operation control means for causing each of the plurality of parameters stored in said parameter storage means to be supplied sequentially to said fuzzy rule operation means during a period when the input signal is latched in said latch means, and causing said set of fuzzy rule operation means to time-divisionally perform a fuzzy rule operation on the basis of said parameters;

center-of-gravity calculating means for, when necessary fuzzy rule operations are completed on the basis of the plurality of sets of parameters, obtaining a center of gravity of an operation result which is output with respect to each rule of the fuzzy rule operation means; and repeat control means for causing said latch means to latch a plurality of input signals after said one inference period, and for repeating said fuzzy inference operation.

2. The apparatus according to claim 1, wherein said parameter storage means is a RAM.

3. A method of controlling a digital fuzzy inference apparatus including sync signal generating means for generating a sync signal, clock pulse generating means for generating a clock pulse, a set of fuzzy rule operation means for performing operations of fuzzy rules constituted by membership functions, parameter storage means for storing parameters as a plurality of sets of parameters used for defining the membership functions of said fuzzy rule operation means, and center-of-gravity calculating means for obtaining a center of gravity of the fuzzy rule operation results, comprising the steps of:

latching a plurality of input data items simultaneously in response to the sync signal, and generating a clock signal;

causing said parameter storage means to output the parameters corresponding to one fuzzy rule to said fuzzy rule operation means in response to the clock pulse;

causing said fuzzy rule operation means to perform a fuzzy rule operation defined by the parameters;

storing an operation result obtained by the fuzzy rule operation;

repeatedly generating the clock pulse;

storing a plurality of operation results of the fuzzy rule operations by sequentially using the plurality of sets of parameters;

outputting the sync signal when necessary parameters of the plurality of sets of parameters are all output;

causing said center-of-gravity calculating means to obtain a center of gravity in synchronism with the sync signal and on the basis of the stored operation results of the fuzzy rule operations; and outputting the sync signal causing said latch means to latch new input data and causing said fuzzy rule operation means to perform a next fuzzy rule operation.

4. A fuzzy inference method of performing a fuzzy inference operation in accordance with input variables in a fuzzy inference operation section for defining if-part and then-part membership functions by using parameters corresponding to each rule stored in storage means, comprising the steps of:

(a) latching a plurality of input signals simultaneously in response to a latch strobe signal;

(b) defining the membership functions in accordance with parameters stored at a read address of said storage means;

(c) performing a fuzzy inference operation to produce a fuzzy operation result by using the latched input variables and the membership functions;

(d) changing the read address of said storage means;

(e) updating the membership functions for each rule in accordance with parameters stored at the read address;

(f) repeating steps (b) to (e) a number of times corresponding to the number of rules and outputting a center-of-gravity calculation output strobe signal at the end of the operation;

(g) obtaining a center of gravity of operation results held in a maximum-value calculator in response to the center-of-gravity calculation output strobe signal; and (h) repeating said steps (a) to (g).

5. A digital fuzzy inference apparatus comprising:

latch means for latching a plurality of inputs for one inference period;

a fuzzy rule storing section for storing a plurality of fuzzy rules;

a rule operation section for performing, one by one, a plurality of rule operations corresponding to said fuzzy rules, in response to a clock pulse and on the basis of data latched in said latch means and data stored in said fuzzy rule storing section; and a rule number storing section for storing data indicating the number of fuzzy rules stored in said fuzzy rule storing section;

wherein, on the basis of the number of times the rule operations are executed and the fuzzy rule number data stored in said rule number storing section, said latch means is restarted, and a read address of said fuzzy rule storing section which is used in said rule operation section is returned to an initial value.

6. A digital fuzzy inference apparatus comprising:

fuzzy inference operation means for sequentially performing a plurality of fuzzy rule operations in synchronism with a clock pulse and outputting an operation result in each inference period;

switching means for switching said fuzzy inference operation means to a non-operating state; and output fixing means for fixing outputs representing operation results at a predetermined value when said fuzzy inference operation means is in the non-operating state.

7. A digital fuzzy inference apparatus comprising:

latch means for latching a plurality of inputs for one inference period;

a fuzzy rule storing section for storing a plurality of fuzzy rules; and a rule operation section for performing, one by one, a plurality of rule operations corresponding to said fuzzy rules, in response to a clock pulse and on the basis of data latched in said latch means and data stored in said fuzzy rule storing sections;

wherein, in response to one clock, said rule operation section calculates a membership value on the basis of the inputs latched in said latch means and membership function parameters stored in said fuzzy rule storing section, and transfers the membership value thus calculated to a minimum value calculating circuit.

* * * * *